United States Patent
Kikuchi et al.

(10) Patent No.: US 9,028,125 B2
(45) Date of Patent: May 12, 2015

(54) LIGHT GUIDE PLATE AND SURFACE LIGHT SOURCE DEVICE

(75) Inventors: Takanori Kikuchi, Osaka (JP); Masami Ito, Osaka (JP); Masaru Fujita, Osaka (JP); Yusuke Kusaka, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 190 days.

(21) Appl. No.: 13/540,978

(22) Filed: Jul. 3, 2012

(65) Prior Publication Data

US 2013/0170250 A1    Jul. 4, 2013

(30) Foreign Application Priority Data

Jul. 5, 2011   (JP) ................................. 2011-149298
Apr. 27, 2012  (JP) ................................. 2012-103586

(51) Int. Cl.
G02B 6/00       (2006.01)
F21V 8/00       (2006.01)

(52) U.S. Cl.
CPC ............ *G02B 6/0016* (2013.01); *G02B 6/0036* (2013.01); *G02B 6/0038* (2013.01); *G02B 6/0061* (2013.01); *G02B 6/0068* (2013.01)

(58) Field of Classification Search
CPC .................................................. G02B 6/0036
USPC .......... 362/617, 619, 620, 623, 625–626, 606
See application file for complete search history.

(56) References Cited

U.S. PATENT DOCUMENTS

| | | | |
|---|---|---|---|
| 5,999,685 A * | 12/1999 | Goto et al. | 385/146 |
| 6,280,063 B1 | 8/2001 | Fong et al. | |
| 7,206,491 B2 * | 4/2007 | Feng et al. | 385/146 |
| 7,431,491 B2 * | 10/2008 | Liao | 362/620 |
| 2003/0174492 A1 | 9/2003 | Ohkawa | |
| 2004/0264911 A1 | 12/2004 | Toeda et al. | |
| 2007/0279551 A1 | 12/2007 | Umebayashi | |
| 2009/0180297 A1 * | 7/2009 | Shim et al. | 362/606 |
| 2013/0335999 A1 | 12/2013 | Doyle et al. | |

OTHER PUBLICATIONS

USPTO Office Action issued Mar. 27, 2014 in corresponding U.S. Appl. No. 13/926,181.

* cited by examiner

*Primary Examiner* — Julie Bannan
(74) *Attorney, Agent, or Firm* — Wenderoth, Lind & Ponack, L.L.P.

(57) ABSTRACT

A light guide plate includes an incident surface on which light outputted from point light sources is incident and an outgoing surface for outputting light incident from the incident surface. A reflection-and-propagation surface for reflecting light toward the outgoing surface is formed in a back surface opposite to the outgoing surface. The outgoing surface is made up of a propagation region adjacent to the incident surface, a propagation auxiliary region adjacent to the propagation region, a first diffusion-and-propagation region adjacent to the propagation auxiliary region, and a second diffusion-and-propagation region adjacent to the first diffusion-and-propagation region. The propagation region, the propagation auxiliary region, and the first diffusion-and-propagation region control hot spots and bright/dark lines in vicinities of the incident surface, while the second diffusion-and-propagation region controls viewing-angle characteristics of the light guide plate.

5 Claims, 30 Drawing Sheets

LIGHT GUIDE PLATE AND SURFACE LIGHT SOURCE DEVICE

BACKGROUND OF THE INVENTION

1. Field of the Invention

The present invention relates chiefly to a surface light source device to be used in backlight units of liquid crystal display panels or the like.

2. Description of the Related Art

In recent years, liquid crystal display devices have been rapidly expanding in application range by virtue of their features such as light weight, thin thickness and low power consumption drive. Liquid crystal display devices, which are not self light-emitting devices, generally need a separate light source such as a backlight. A backlight unit is composed mainly of a light source and a light guide plate for guiding light outputted from the light source to provide surface emission.

Generally, backlight units can be classified into direct type, edge light type, or the like depending on the position of the light source. With a direct type backlight unit, a multiplicity of light sources, e.g. cold-cathode tubes or LEDs (Light Emitting Diodes), are provided directly under the light guide plate so that light incoming from the light sources is diffused at the light guide plate so as to be applied to a liquid crystal display panel via a plurality of optical sheets. With an edge-light type backlight unit, a light source is provided at a side end of a light guide plate so that light incident from the light source is diffused at the light guide plate so as to be applied to a liquid crystal display panel via a plurality of optical sheets.

FIG. 28 shows an example of an edge-light type backlight unit in which LEDs are adopted.

As shown in FIG. 28, a plurality of LEDs 106 serving as point light sources are placed in a side face of the light guide plate 101. Also, a diffusion sheet 102 is placed above the light guide plate 101, and the diffusion sheet 102 widely diffuses light outputted from the light guide plate 101. Further, a prism sheet 103 is placed above the diffusion sheet 102, a prism sheet 104 is placed above the prism sheet 103, and an optical sheet 105 is placed above the prism sheet 104, where the individual sheets act to converge light into visual directions so that higher luminance can be achieved.

For material of the light guide plate 101, transparent resin panels or the like are used conventionally. The light guide plate 101 has an incident surface at a side face between an outgoing surface and a bottom face opposed to the outgoing surface, the incident surface having a primary light source such as a cold-cathode tube or point light sources given by a plurality of arrayed LEDs 106. Also, scattered dots are printed on the bottom face of the light guide plate 101, so that luminance distributions in the visual directions are controlled so as to be uniformized by adjusting size, density or the like of the dots. With such an arrangement, light outputted from the primary light source becomes incident on the light guide plate 101 via the incident surface, passing through inside of the light guide plate and outputted from the outgoing surface toward the liquid crystal display part. However, due to an influence of the scattered dots in the bottom face of the light guide plate, light immediately after being outputted from the light guide plate 101 has an orientation distribution spreading to a wide angle, making it difficult to direct the light toward the visual directions.

Therefore, two prism sheets 103, 104 parallel to each other as well as an optical sheet 105 are used in order to converge the light outputted from the light guide plate 101 to the visual directions for higher luminance. However, with such an arrangement, the prism sheet, which is high priced, needs to be used two in number, causing an increase in the number of component parts of the unit so that the assembly becomes complicated as a problem.

Accordingly, in order to solve the above problems, there have been made many proposals for directing the light outputted from the outgoing surface toward the visual directions by forming prisms in the outgoing surface of the light guide plate or the bottom face opposed to the outgoing surface or the like. However, placement of prism in regular array causes hot spots (light-gathering portions, luminous spots) or bright/dark lines to occur in vicinities of the incident surface, with the result that the uniformity of the surface light source is impaired. Also, the placement interval of LEDs has been increasing, as compared with conventional ones, together with increasing brightness per LED chip, resulting in more influences of the directivity of LEDs.

For solution of the above problems, there has been made a proposal for improving the hot spots and bright/dark lines by using a plurality of prisms in the shape of the outgoing surface (see, e.g., Document 1).

FIGS. 29 and 30 show an outgoing surface shape of a light guide plate 22 described in Document 1.

FIG. 29 is a perspective view of the light guide plate 22 in Embodiment 1 of Document 1. The light guide plate 22 has an incident surface 221 for a light source, and an outgoing surface 223 adjacent to the incident surface 221. The outgoing surface 223 is composed of a first region 223A adjacent to the incident surface 221, and a second region 223B adjacent to the first region 223A at a position different from that for the incident surface 221.

FIG. 30 is a top view of the light guide plate 22. A boundary between the first region 223A and the second region 223B is assumed as an imaginary borderline parallel to the incident surface 221.

As shown in FIGS. 29 and 30, in the second region 223B of the outgoing surface 223, a plurality of elongate prism lenses 225 are formed, where each of side edges of the prism lenses 225 extends along a direction orthogonal to the incident surface 221. Further, in the first region 223A of the outgoing surface 223, a plurality of elongate tetrahedral lenses 226 are formed in regular and periodical placement.

As shown in FIG. 29, the prism lenses 225, each made from a V-shaped protrusion, are placed in array all over the second region 223B. FIG. 31 shows a cross-sectional view taken along the line III-III of FIG. 30, and each V-shaped protrusion has a triangular cross section as shown in FIG. 31.

As shown in FIG. 31, according to Embodiment 1 of Document 1, an apex angle θ1 of each triangular cross section is set to about 175° or less. A length of a lower end of each triangular cross section is set to about 2.0 mm or less, and a height H of each triangular cross section of the individual prism lenses 225 is also set to about 2.0 mm or less.

Referring to FIG. 29, the tetrahedral lenses 226 are arrayed in correspondence to the prism lenses 225 along a direction parallel to the incident surface. Each tetrahedral lens 226 has a first side face 2261 facing a prism lens 225, mutually opposed second side face 2263 and third side face 2265, and a bottom face (not shown). The first side face 2261 is located at the borderline III-III of FIG. 30. Also as shown in FIG. 30, the first side face 2261 of the tetrahedral lenses 226 and a terminal end of the prism lenses 225 are interconnected with each other, respectively, at the borderline III-III, so that the tetrahedral lenses 226 and the prism lenses 225 are connected to each other, correspondingly and respectively. As a result, in correspondence to the apex angle θ1 of each triangular cross section of the prism lenses 225, the apex angle of each first side face 2261 is also set to about 175° or less. Besides, the length of the lower end of each first side face 2261 is set to about 2.0 mm or less, and the height H of each first side face 2261 is also set to 2.0 mm or less.

FIG. 32 is a cross section taken along the line IV-IV of FIG. 30. As shown in FIG. 32, a ridge defined by the second side face 2263 and the third side face 2265 of each tetrahedral lens 226 has a projected angle θ2 and an adding point relative to the outgoing surface 223 (a point at which the incident surface 221 and the ridge line of the second side face 2263 and the third side face 2265 intersect each other). According to Embodiment 1 of Document 1, the angle θ2 is set to about 85° or less.

Document 1 proposes that adopting the above-described structure makes it possible to suppress hot spots or bright/dark lines occurring in the outgoing surface.

Document 1: U.S. Pat. No. 7,431,491

However, with the above-described structure of Document 1, since each prism is made up from regions of the outgoing surface adjacent to the incident surface, widened placement intervals of LEDs would cause bright/dark portions to occur in portions of the outgoing surface in vicinities of the incident surface due to influences of the directivity of the LEDs. Besides, setting outer dimensions of the light guide plate equal to the effective light-emission area would cause the light guide plate to be expanded and contracted by influences of heat of the LEDs, so that it may become impossible to output light stably from the effective light-emission area. Therefore, it is desirable that the outer dimensions of the light guide plate be larger than the effective light-emission area. In such a case, with the prism shapes present outside the effective light-emission area, light that is originally not intended for use in the liquid crystal display device would be outputted to the outgoing surface in the prism shape regions. As a result, use efficiency of light would lower, involving more than necessary power consumption.

Also, with the structure of FIG. 30, light spreading in portions of the outgoing surface in vicinities of the incident surface becomes larger, so that scrolling light emission of the liquid crystal screen causes light to leak to unnecessary places. Such light is seen as an afterimage in the screen so as to deteriorate the screen quality, leading to an impairment of the split light-emission property.

SUMMARY OF THE INVENTION

Accordingly, an object of the present invention, lying in solving the above-described problems, is to provide a light guide plate in which a region of the outgoing surface adjacent to the incident surface is formed as a flat surface portion while a plurality of prism protrusions extending orthogonal to the incident surface are formed in a portion of the outgoing surface adjacent to the flat surface portion so that the split light-emission property is not impaired and moreover the occurrence of hot spots and bright/dark lines is suppressed.

In order to achieve the above object, the present invention has the following constitutions.

According to a first aspect of the present invention, there is provided a light guide plate comprising:

an incident surface on which light outputted from a plurality of point light sources is incident;

an outgoing surface from which light incident from the incident surface is outputted; and a reflection-and-propagation surface at which the light incident from the incident surface is reflected so as to propagate the light toward the outgoing surface, the reflection-and-propagation surface being opposed to the outgoing surface, wherein a plurality of prism grooves extending parallel to the incident surface are formed in the reflection-and-propagation surface, a flat surface portion is formed in a region of the outgoing surface adjacent to the incident surface, and a plurality of prism protrusions extending orthogonal to the incident surface are formed in a prism portion provided in a region of the outgoing surface adjacent to the flat surface portion.

According to a second aspect of the present invention, there is provided a light guide plate comprising:

an incident surface on which light outputted from a plurality of point light sources is incident;

an outgoing surface from which light incident from the incident surface is outputted; and a reflection-and-propagation surface at which the light incident from the incident surface is reflected so as to propagate the light toward the outgoing surface, the reflection-and-propagation surface being opposed to the outgoing surface, wherein a plurality of prism grooves extending parallel to the incident surface are formed in the reflection-and-propagation surface, a flat surface portion is formed n a region of the outgoing surface adjacent to the incident surface, in a first prism portion provided in a region of the outgoing surface adjacent to the flat surface portion, a plurality of prism protrusions extending orthogonal to the incident surface and planar portions are formed alternately in a direction parallel to the incident surface, respectively, and in a second prism portion provided in a region of the outgoing surface not adjacent to the flat surface portion but adjacent to the first prism portion, a plurality of prism protrusions extending orthogonal to the incident surface are formed while no planar portions are formed therein.

According to a third aspect of the present invention, there is provided a light guide plate comprising:

an incident surface on which light outputted from a plurality of point light sources is incident;

an outgoing surface from which light incident from the incident surface is outputted; and a reflection-and-propagation surface at which the light incident from the incident surface is reflected so as to propagate the light toward the outgoing surface, the reflection-and-propagation surface being opposed to the outgoing, surface, wherein a plurality of prism grooves extending parallel to the incident surface are formed in the reflection-and-propagation surface, a flat surface portion is formed in a region of the outgoing surface adjacent to the incident surface, in a propagation auxiliary region provided in a region of the outgoing surface adjacent to the flat surface portion, a plurality of inclined prism protrusions extending orthogonal to the incident surface and planar portions are formed alternately in a direction parallel to the incident surface, respectively, in a first prism portion provided in a region of the outgoing surface adjacent to the propagation auxiliary region, a plurality of inclined prism protrusions extending orthogonal to the incident surface and planar portions are formed alternately in a direction parallel to the incident surface, respectively, and in a second prism portion provided in a region of the outgoing surface not adjacent to the propagation auxiliary region but adjacent to the prism portion, a plurality of prism protrusions with a constant height extending orthogonal to the incident surface are formed while no planar portions are formed therein.

According to a forth aspect of the present invention, there is provided the light guide plate according to any one of the first aspect to the third aspect, wherein bent portions are formed at upper ends of the prism protrusions in the individual regions.

According to a fifth aspect of the present invention, there is provided the light guide plate according to the forth aspect, wherein in the prism protrusions, a ratio of bent portion length to linear portion length is from 0.3 to 1.0.

According to a sixth aspect of the present invention, there is provided the light guide plate according to the third aspect, wherein ridges of the prism protrusions of the propagation auxiliary region and ridges of the prism protrusions of the first prism portion are formed in continuation to each other, and the ridges of the prism protrusions in the propagation auxiliary region are larger in gradient than the ridges of the prism protrusions in the first prism portion.

According to a seventh aspect of the present invention, there is provided the light guide plate according to the fifth aspect, wherein height of the prism protrusions keeps constant or continuously increases from the incident surface toward a center of the light guide plate.

According to a eighth aspect of the present invention, there is provided the light guide plate according to the seventh aspect, wherein each prism ridge of the prism protrusions is formed by a curved line including a straight line.

According to a ninth aspect of the present invention, there is provided the light guide plate according to the eighth aspect, wherein the prism protrusions have V-shaped cross-sectional configurations in a cross section thereof parallel to the incident surface.

According to a tenth aspect of the present invention, there is provided the light guide plate according to the ninth aspect, wherein the prism grooves are formed so as to have a maximum groove depth at a center of the light guide plate and become continuously shallower toward the incident surface.

According to a eleventh aspect of the present invention, there is provided a backlight unit including the light guide plate according to any one of the first aspect to the tenth aspect, and a plurality of point light sources.

According to a twelfth aspect of the present invention, there is provided a surface light source device including the light guide plate according to any one of the first aspect to the tenth aspect, at least one diffusion sheet, at least one prism sheet, a plurality of optical sheets for controlling light derived from the light guide plate, a reflecting sheet provided on one side opposite to the diffusion sheet with the light guide plate interposed therebetween and reflecting light toward the outgoing surface, and LEDs.

As described above, according to the light guide plate of the invention, it becomes implementable to suppress hot spots and bright/dark lines without impairing the split light-emission property and the light use efficiency.

BRIEF DESCRIPTION OF THE DRAWINGS

These aspects and features of the present invention will become clear from the following description taken in conjunction with the preferred embodiments thereof with reference to the accompanying drawings, in which.

DETAILED DESCRIPTION OF THE PREFERRED EMBODIMENTS

Hereinbelow, embodiments of the present invention will be described in detail with reference to the accompanying drawings.

Embodiment 1

Embodiment 1 of the invention is described with reference to FIGS. 1 to 15.

Figure 1:
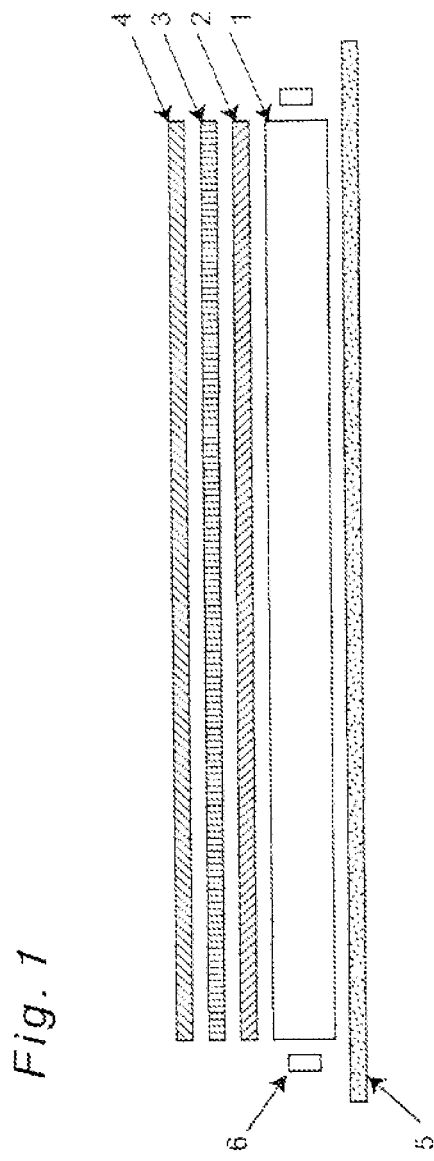
FIG. 1 is a schematic sectional view of a surface light source device according to Embodiment 1 of the invention.

FIG. 1 is a sectional view showing a surface light source device according to Embodiment 1. As shown in FIG. 1, the surface light source device includes a light guide plate 1, a diffusion sheet 2, a prism sheet 3, an optical sheet 4, a reflecting sheet 5, and LEDs 6. The light guide plate 1 is formed from a material such as transparent resins (e.g., acrylic resins, polycarbonate). The diffusion sheet 2 for diffusing light outputted from the upper surface of the light guide plate 1 is provided above the light guide plate 1. The diffusion sheet 2 is made up by diffusing materials of different refractive index inside a sheet of transparent resin or the like, or by diffusing a transparent spherical-shaped material on a transparent sheet, or by forming depressions and projections on a surface of a transparent sheet. Light outputted from the diffusion sheet 2 has an orientation distribution spreading to a wide angle, so that most of the light is directed in other than visual directions.

Accordingly, with an aim of achieving higher luminance by converging light outputted from the diffusion sheet 2 to visual directions, a prism sheet 3 (directional sheet) is provided above the diffusion sheet 2, and for even higher luminance, an optical sheet 4 is provided above the prism sheet 3.

The reflecting sheet 5 is placed so as to cover the lower face of the light guide plate 1 and later-described point-light-source LEDs 6, so that the light is reflected toward an outgoing surface 11. The reflecting sheet 5 is made up, for example, by densely diffusing foam of several μm to several tens of μm inside a transparent resin sheet, or by depositing silver, aluminum or other high-reflectivity material on a resin sheet, metal plate or the like.

The LEDs 6, which are point light sources: are provided as shown in FIG. 1 so as to be arrayed each in plurality in near-side-face shorter-edge side two places of the light guide plate 1. In Embodiment 1, the LEDs 6 counting 70 pieces on one side and 140 pieces on the two sides are placed at equal intervals. Also, a thicknesswise center of the light guide plate 1 and a thicknesswise center of the LEDs 6 are set coincident with each other.

(Details of the Light Guide Plate 1)

Next, details of the configuration of the light guide plate 1 are described with reference to FIGS. 2 to 12.

Figure 2:
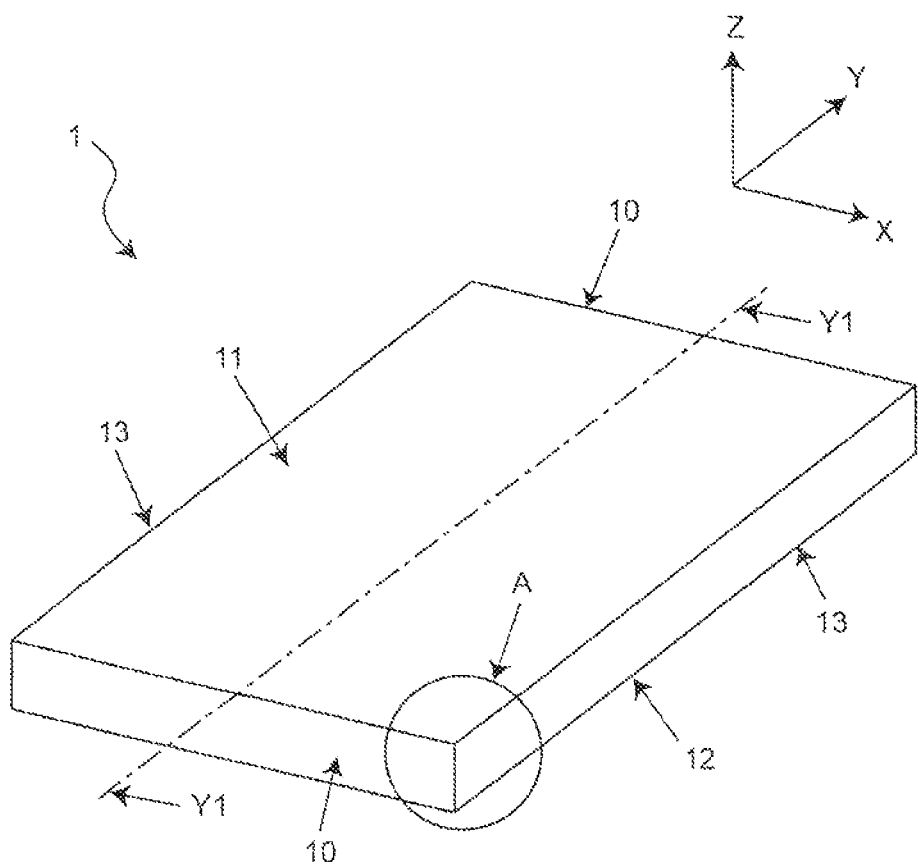
FIG. 2 is a perspective view of a light guide plate according to Embodiment 1 of the invention.

FIG. 2 shows an appearance of the light guide plate 1. As shown in FIG. 2, the light guide plate 1 is formed into a generally rectangular parallelepiped shape and includes an incident surface 10 on which light outputted from the LEDs 6 shown in FIG. 1 comes incident, an outgoing surface 11 from which light incident from the incident surface 10 is outputted, a reflection-and-propagation surface 12 (propagation-and-reflection surface 12) facing the outgoing surface 11 and serving for propagating and reflecting light coming incident from the incident surface 10 toward the outgoing surface 11, and side faces 13 adjacent to these surfaces. All of these surfaces are finished to optical flat surfaces. As shown in FIG. 2, it is assumed that a direction parallel to the incident surface 10 and orthogonal to the side faces 13 is an X direction, a direction orthogonal to the incident surface 10 and parallel to the side faces 13 is a Y direction, and a direction parallel to the incident surface 10 and orthogonal to the outgoing surface 11 is a Z direction.

Figure 3:
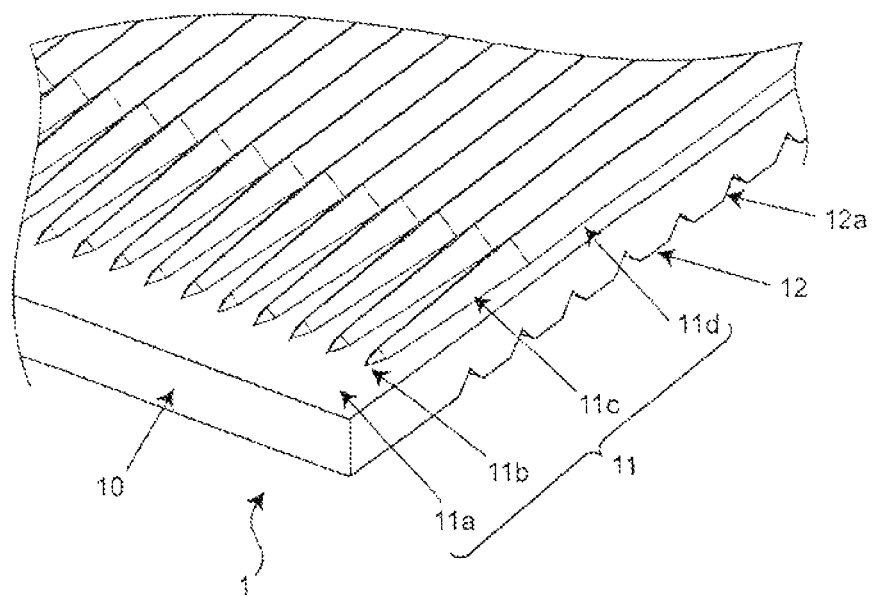
FIG. 3 is a perspective view of A part of the light guide plate according to Embodiment 1 of the invention.

Details of A part of FIG. 2 are explained by FIG. 3. As shown in FIG. 3, a plurality of prism grooves 12a extending in the X direction are placed in the reflection-and-propagation surface 12. A cross section of the prism grooves 12a as viewed in a plane orthogonal to the incident surface 10 is V-shaped. Also, the prism grooves 12a are so made as to become maximum in depth at a center of the light guide plate 1 and continuously shallower toward the incident surface 10. In Embodiment 1, the pitch of prisms is set to 500 μm, and the depth of the prism grooves 12a is defined as within a range of 4 μm to 70 μm.

Figure 4:
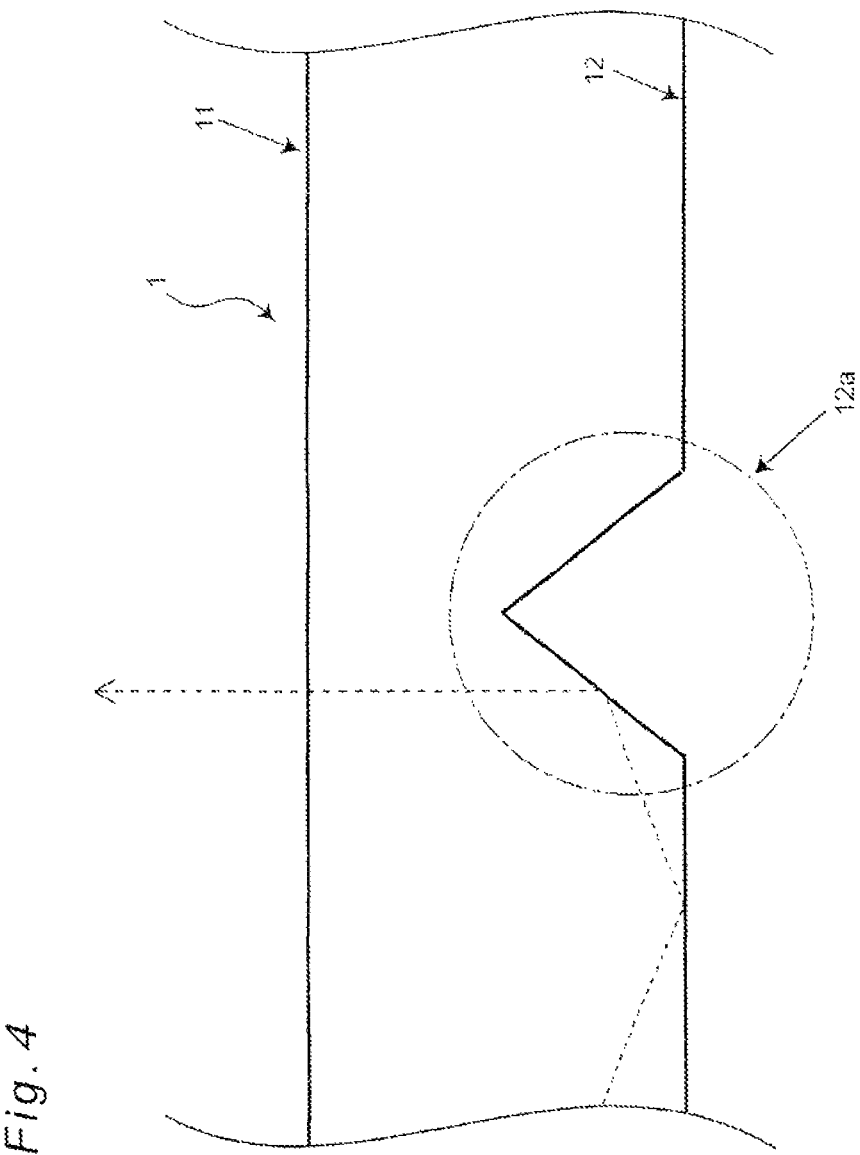
FIG. 4 is a sectional view of a reflection-and-propagation surface of the light guide plate according to Embodiment 1 of the invention.

FIG. 4 shows a schematic optical path diagram in the reflection-and-propagation surface 12. As shown in FIG. 4, providing the prism grooves 12a allows light to impinge on the prism grooves 12a and change in its reflection-and-propagation direction. Also, the prism grooves 12a are increased and decreased in depth (in the Y direction) as described above so that slopes formed on the prism grooves 12a are increased and decreased in area, thus making it possible to change the quantity of light propagated and reflected toward the outgoing surface 11 side.

Figure 5:
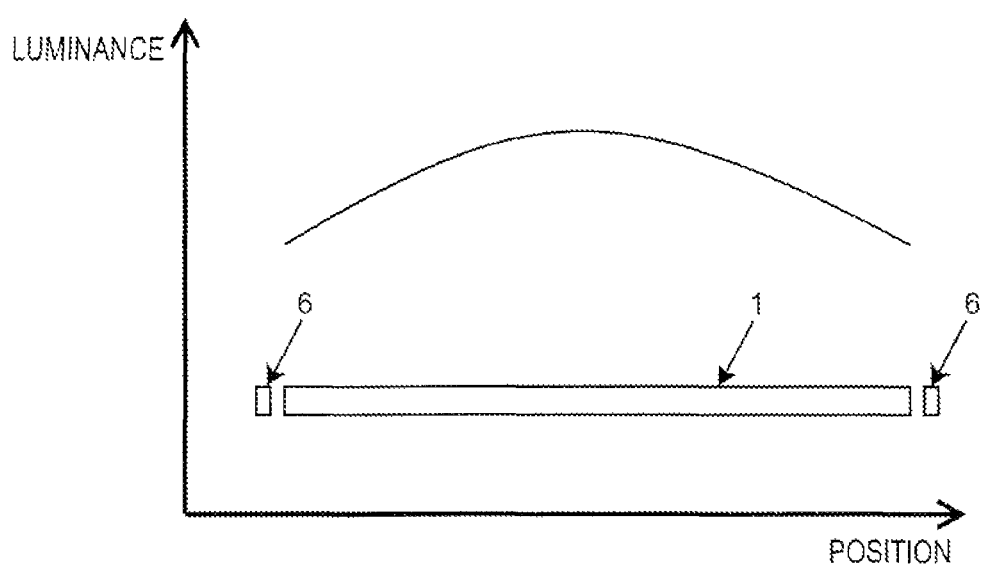
FIG. 5 is a luminance distribution chart of light outputted from a backlight unit at a Y1-Y1 cross section of the light guide plate according to Embodiment 1 of the invention.

FIG. 5 shows a luminance distribution of light outputted from a backlight unit in a cross section taken along the line Y1-Y1 of FIG. 2. Since the prism grooves 12a are set in depth so as to be deeper in central portion of the light guide plate 1 and shallower in vicinities of the incident surface 10, luminance is higher increasingly toward central portion of the light guide plate 1 as shown in FIG. 5. Thus, luminance distribution of the outgoing light can be changed by adjusting the shape of the prism grooves.

As shown in FIG. 3, formed in the outgoing surface 11 are a propagation region 11a extending an entire length of the outgoing surface 11 adjacent to the incident surface 10 and serving for propagating incident light while diffusing the light, a propagation auxiliary region 11b adjacent to the propagation region 11a in the Y direction and serving for propagating propagated light while diffusing the light, a first diffusion-and-propagation region 11c adjacent to the propagation auxiliary region 11b in the Y direction and serving for propagating propagated light while diffusing the light, and a second diffusion-and-propagation region 11d adjacent to the first diffusion-and-propagation region 11c in the Y direction and serving for propagating propagated light while diffusing the light.

The propagation region 11a is a flat surface portion formed by a planar surface having no prism protrusions and finished to an optical plane, its surface roughness being defined as Rt=0.03 or less. Since no prism protrusions are present in the propagation region 11a, light is totally reflected at the propagation region 11a, propagating to the propagation auxiliary region 11b. Thus, the quantity of outgoing light in visual directions relative to the quantity of incident light becomes smaller in the propagation region 11a. Therefore, the quantity of outgoing light in the visual directions is generally defined by three regions (the propagation auxiliary region 11b, the first diffusion-and-propagation region 11c, and the second diffusion-and-propagation region 11d) excluding the propagation region 11a.

Figure 6:
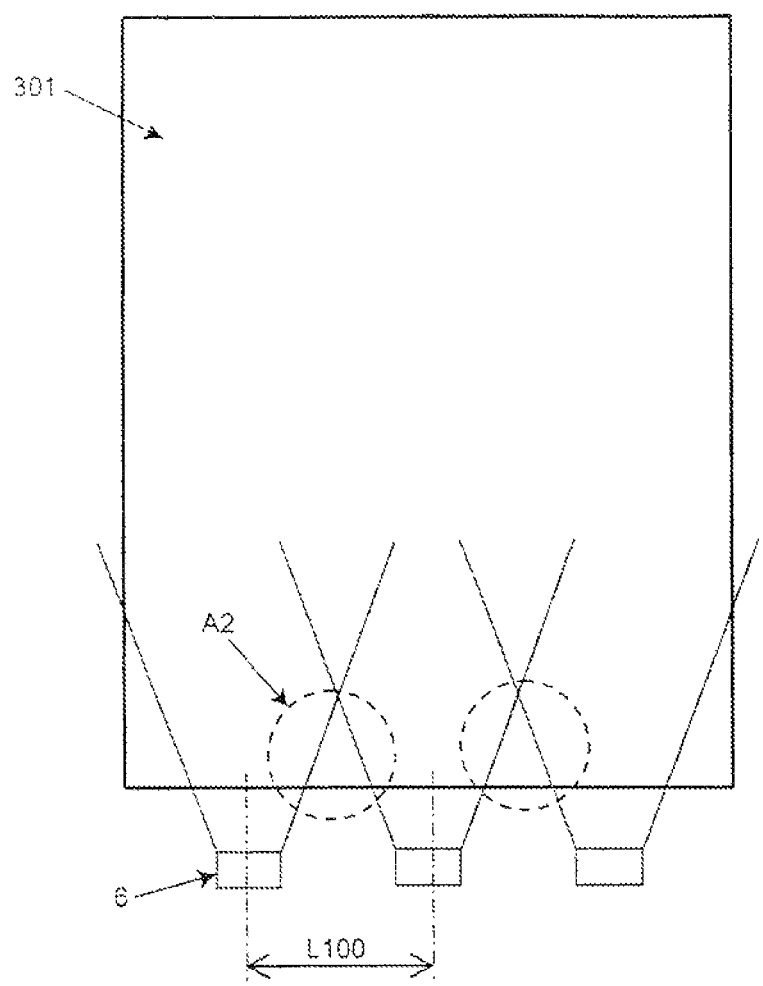
FIG. 6 is an outline view of dark-portion occurrence places occurring due to widening of the LED placement pitch in a general light guide plate.

Now an outline view of dark-portion occurrence places due to widening of the LED placement pitch in a general light guide plate is shown in FIG. 6. As shown in FIG. 6, a widened placement interval L100 of the LEDs 6 causes dark portions A2 to more easily occur in vicinities of the incident surface. In this Embodiment 1, for prevention of such occurrence of dark portions A2, the propagation region 11a is provided adjacent to the incident surface 10 in the outgoing surface 11. By the provision of the propagation region 11a, the effective light-emission area (first diffusion-and-propagation region 11c and second diffusion-and-propagation region 11d in this Embodiment 1) can be prevented from effects of expansion and contraction of the light guide plate 1 due to heat from the light sources. Further, the dark portions A2 occurring depending on LED placement positions and directional characteristics can be converged within the propagation region 11a, which is outside the effective light-emission area.

Figure 7:
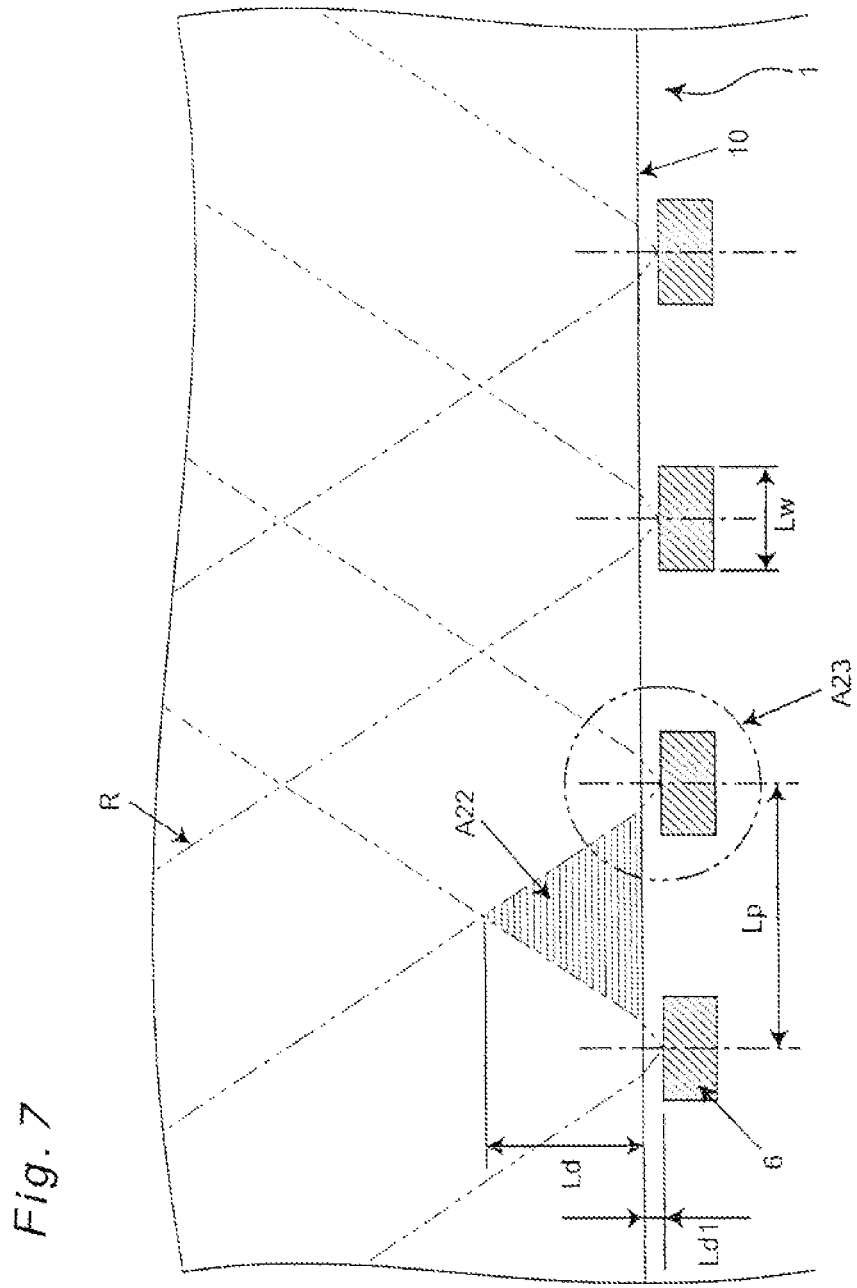
FIG. 7 is a top view of vicinities of the incident surface in the light guide plate, as viewed from the outgoing surface side.

Next, range setting for the propagation region 11a is explained in detail. FIG. 7 shows an optical path of light outputted from the LEDs 6, as a vicinity of the incident surface 10 in the light guide plate 1 is viewed from the outgoing surface 11 side. In FIG. 7, lines R represent rays of light outputted from half-value angles of the directional characteristics of the LEDs 6. It is noted here that a crossing portion A22, which is a region surrounded by the lines R and the incident surface 10 in the outgoing surface 11, is included in the dark portion A2 shown by FIG. 6 and occurs depending on placement positions and directional characteristics of the LEDs 6. As shown in FIG. 7, ranges of the crossing portion A22 and the dark portion A2 are changed depending on the LED placement pitch Lp, the width Lw of one LED alone, and the directivity of the LEDs.

Figure 8:
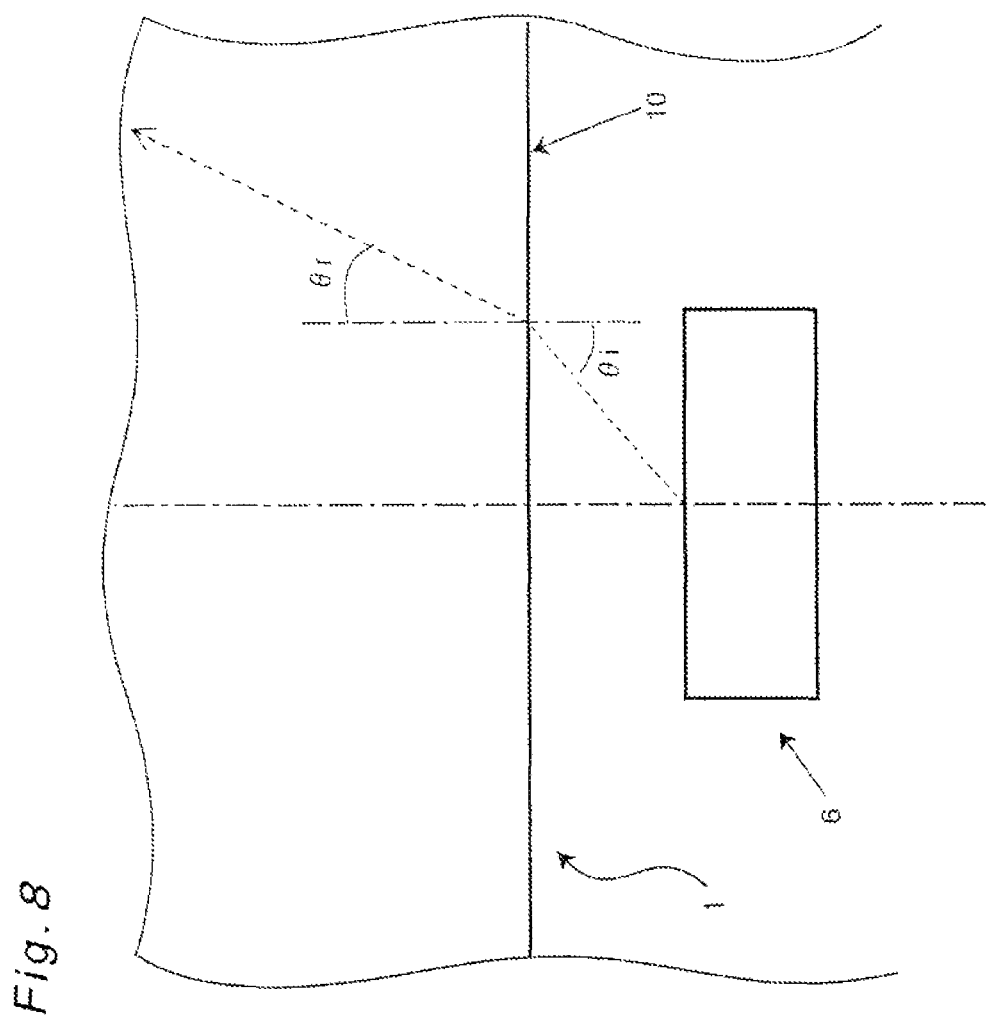
FIG. 8 is an enlarged detail view of A23 part.

FIG. 8 shows an enlarged detail view of A23 part. As shown in FIGS. 7 and 8, given an incident angle θi from an LED 6 to the light guide plate 1, a refractive angle θr, a refractive index n1 from the LED 6 to the light guide plate 1, a refractive index n2 in the light guide plate 1, a distance Ld1 from the LED 6 to the incident surface 10, and a distance (dark-portion occurrence distance) Ld from the incident surface 10 to the crossing portion A22, the following equation can be derived from Snell's law:

$$n1 \times \sin(\theta i) = n2 \times \sin(\theta r) \quad \text{(Eq. 1)}$$

Developing this equation further leads to the following equation:

$$Ld = [Lp/2 - Ld1 \times \tan(\theta i)] \times \tan(90 - \theta r) \quad \text{(Eq. 2)}$$

As can be understood from this equation, the range of the propagation region 11a may appropriately be set by referencing the dark-portion occurrence distance Ld.

As shown in FIG. 3, prism protrusions are formed in the propagation auxiliary region 11b, the first diffusion-and-propagation region 11c and the second diffusion-and-propagation region 11d. The first diffusion-and-propagation region 11c and the second diffusion-and-propagation region 11d are called prism portions (first prism portion and second prism portion). The prism protrusions are so formed that when the light guide plate 1 is viewed from upward (in the Z direction), the prism protrusions extend in directions orthogonal to the incident surface 10 (in the Y direction) as well as in directions perpendicular to the prism grooves 12a formed in the reflection-and-propagation surface 12.

Figure 9:
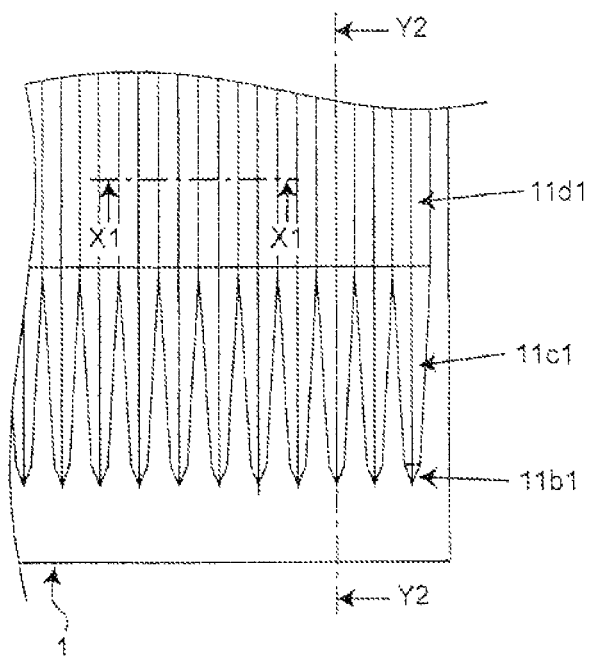
FIG. 9 is a top view of A part of the light guide plate according to Embodiment 1 of the invention.

FIG. 9 is a top view of the light guide plate 1 at A part of FIG. 2. As shown in FIG. 9, a prism ridge 11b1 formed in the propagation auxiliary region 11b, a prism ridge 11c1 formed in the first diffusion-and-propagation region 11c, and a prism ridge 11d1 formed in the second diffusion-and-propagation region 11d are connected to one another, by which a continuous ridge is formed.

Figure 10:
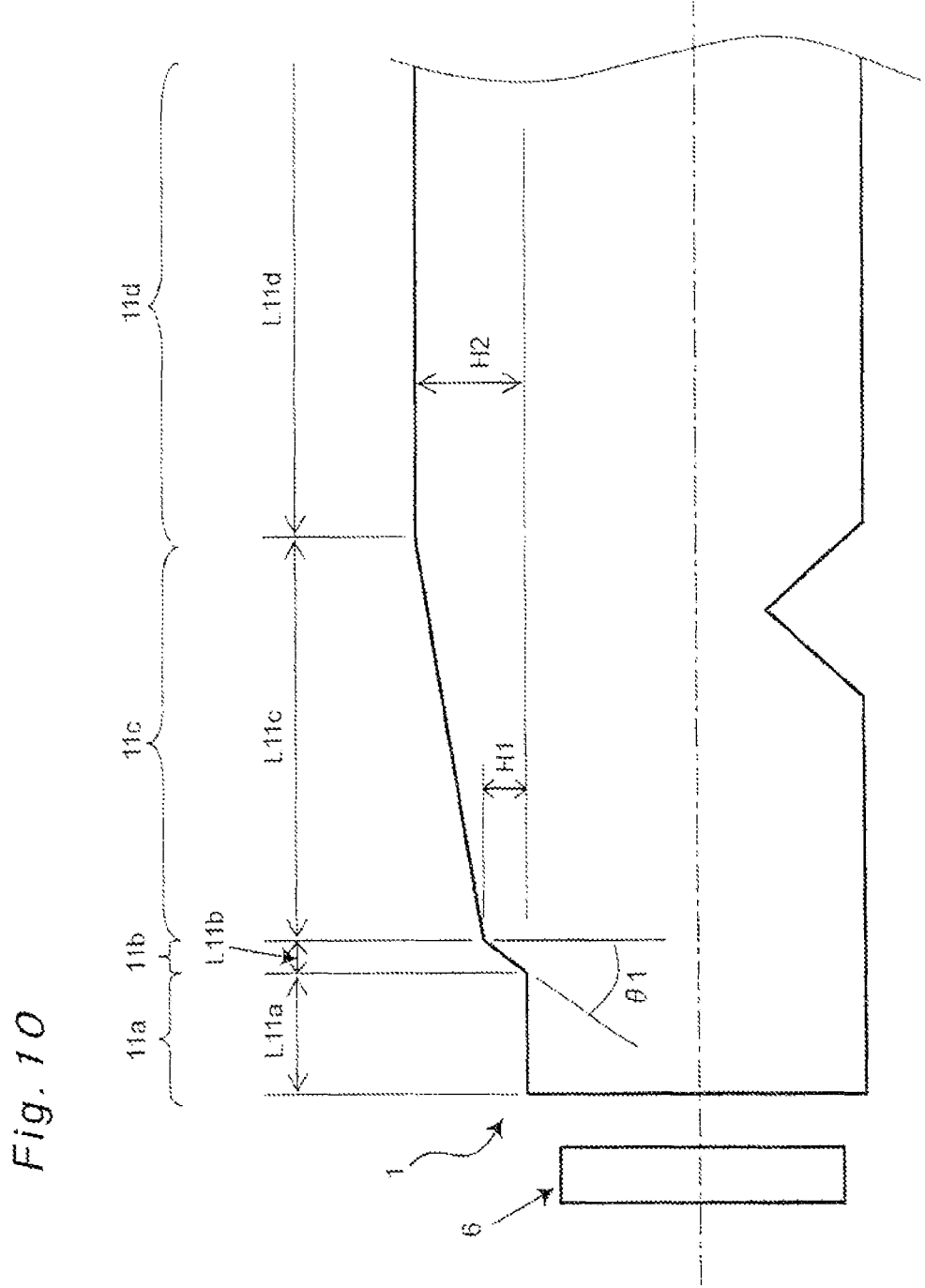
FIG. 10 is a sectional view of the light guide plate, taken along the line Y2-Y2, according to Embodiment 1 of the invention.
Figure 11:
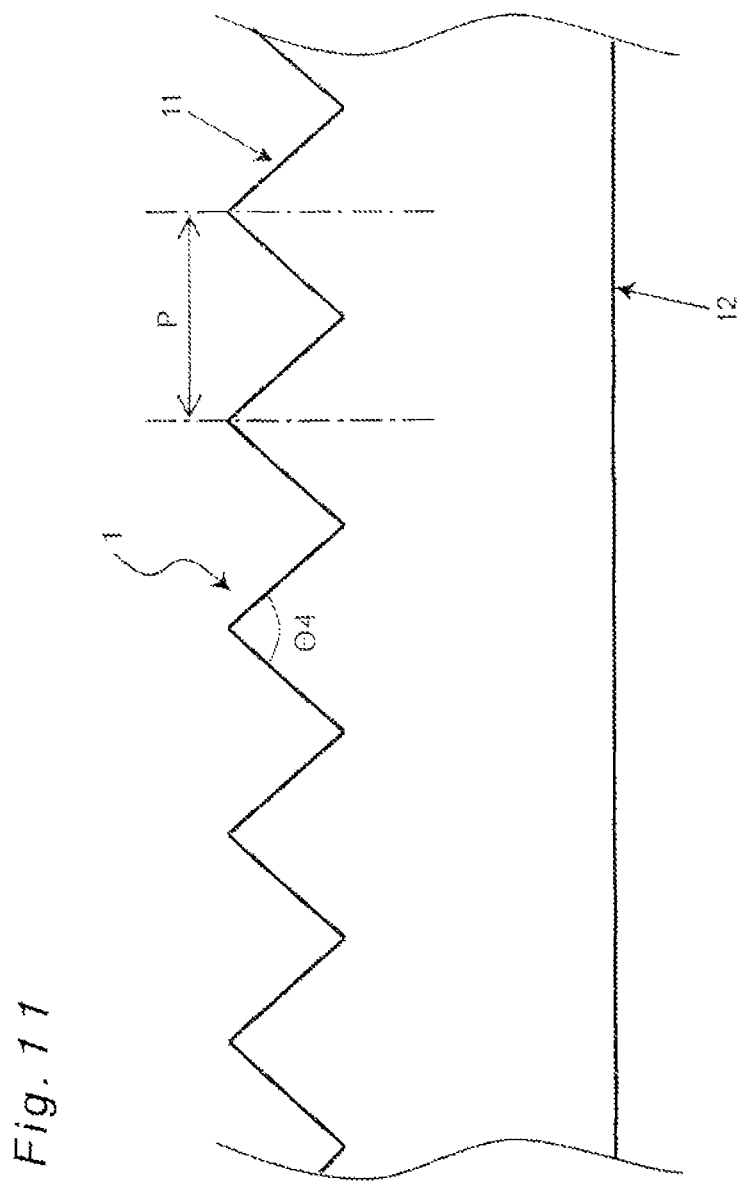
FIG. 11 is a sectional view of the light guide plate, taken along the line X1-X1, according to Embodiment 1 of the invention.

For views of the configuration of the light guide plate 1 at different angles, FIG. 10 shows a sectional view of the light guide plate 1 taken along the line Y2-Y2 of FIG. 9, and FIG. 11 shows a sectional view of the light guide plate 1 taken along the line X1-X1 of FIG. 9. Detailed configuration of the light guide plate 1 will be described later.

(A Case where No Prism Protrusions are Formed in the Outgoing Surface 411)

Figure 12:
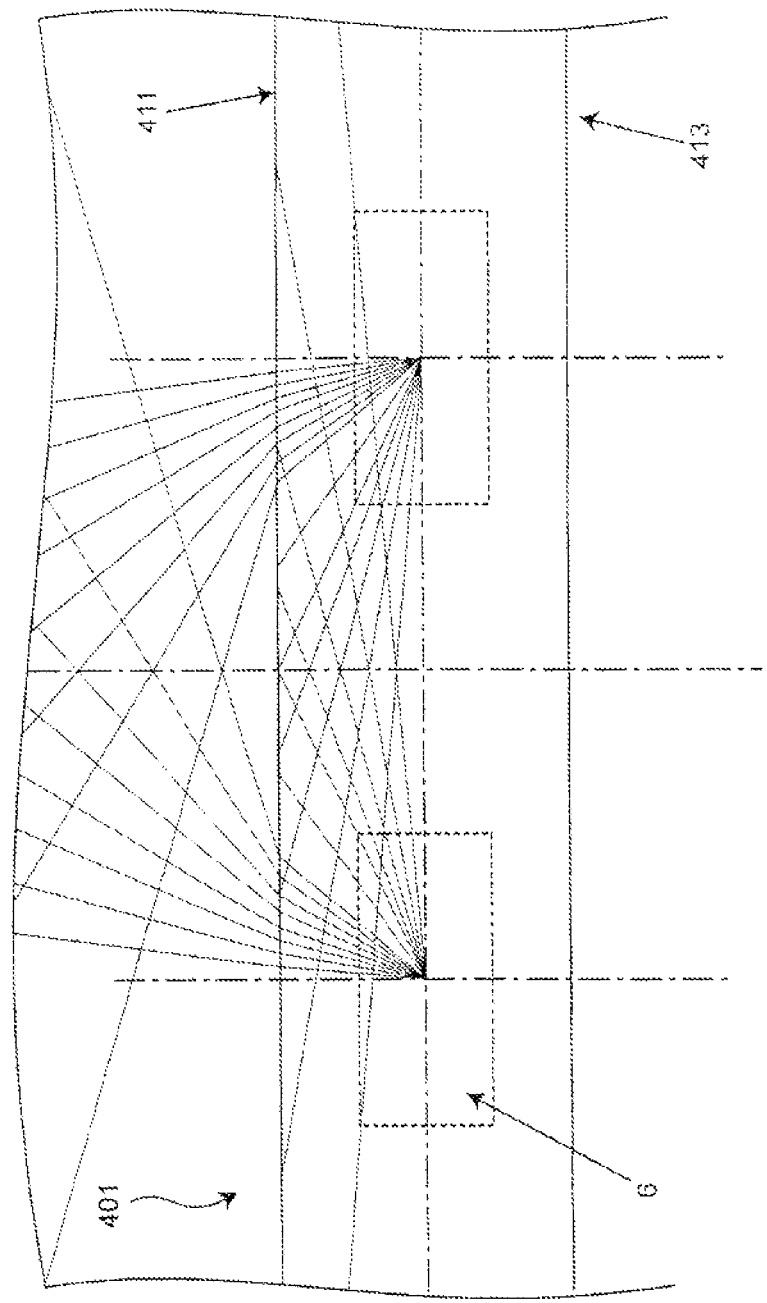
FIG. 12 is an optical path diagram of the light guide plate in which no prism protrusions are formed in the outgoing surface, according to Embodiment 1 of the invention.

FIG. 12 shows an optical path diagram resulting when a light guide plate 401 is viewed in a cross section (XZ cross section) parallel to an incident surface 410 in a case where the outgoing surface 411 is provided as a flat surface with no prism protrusions formed therein.

As shown in FIG. 12, with no prism protrusions formed in the outgoing surface 411, light incident from the LEDs 6 enters the light guide plate 401 through the incident surface 410, being repeatedly reflected and refracted within the light guide plate 401 and then outputted from the outgoing surface 411 in a state of being spread against a frontal direction. With split light emission applied, light goes out to unnecessary ranges due to the spreading of light, making a factor for deteriorating light characteristics. A phenomenon resultantly occurring to the outgoing surface 411 of the light guide plate 401, as it is viewed from upward of the outgoing surface 411 (in the Z direction), is shown in FIG. 13.

Figure 13:
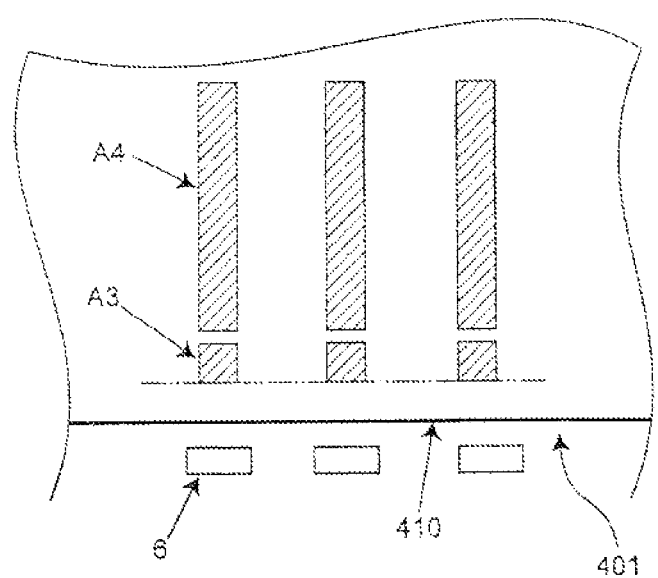
FIG. 13 is a top view showing hot-spot and bright/dark-line occurrence positions in the light guide plate in which no prism protrusions are formed in the outgoing surface, according to Embodiment 1 of the invention.

FIG. 13 shows hot spots A3 and bright lines A4 occurring to the outgoing surface 411 in a case where the whole outgoing surface 411 is formed as a planar surface portion with no prism protrusions formed therein.

First, the hot spots A3 occurring in regions near the incident surface 410 are explained. As shown in FIG. 12, in the outgoing surface 411, with increasing closeness to the frontal direction (Y direction) of an LED 6, the incident angle of light tends to decrease, so that light can more easily be extracted. On the other hand, with increasing distance from the frontal direction of the LED 6, the incident angle increases, causing light to be totally reflected, so that light can less easily be extracted. Therefore, as shown in FIG. 13, in regions of the outgoing surface 411 in vicinities of the incident surface 410, light is extracted with concentration to the frontal direction of the LED 6, giving rise to the hot spots A3, which are portions brighter than their surrounding vicinities. On the other hand, with certain extents of distance from the incident surface 410, bright lines A4 occur in the frontal direction of the LED 6, where light becomes more intense, due to imbalance of light intensity caused by influences of the directivity of the LED 6. It is noted that with furthermore extents of distances, the light intensity is balanced by influences of light outputted from the other LEDs, causing the bright lines A4 to disappear. Thus, the hot spots A3 and the bright lines A4 occur depending largely on the directivity of the LEDs 6, and both the hot spots A3 and the bright lines A4 occur in the frontal directions of the LEDs 6 in the case where no prism protrusions are formed in the whole outgoing surface 411. Also, as the LED placement pitch increases or the total luminous flux per LED increases, there arise even larger darkness-and-brightness differences between regions of the hot spots A3 or the bright lines A4 and their surrounding regions.

(A Case where Prism Protrusions are Formed in the Whole Effective Light-Emission Area of Outgoing Surface 511)

Figure 14:
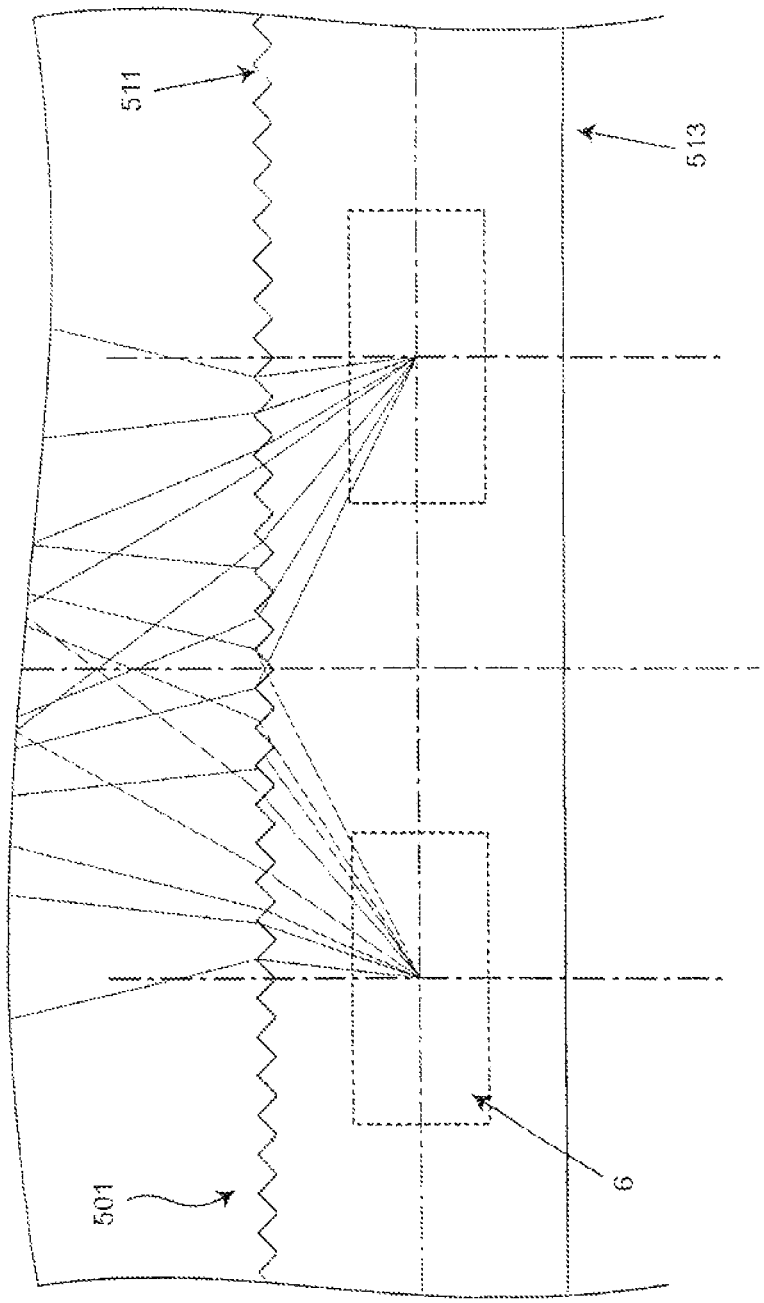
FIG. 14 is an optical path diagram of the light guide plate in which prism protrusions are formed all over the effective light-emission area in the outgoing surface, according to Embodiment 1 of the invention.

In another aspect, FIG. 14 shows an optical path diagram resulting when a light guide plate 501 is viewed in a cross section (XZ cross section) parallel to an incident surface 510 in a case where prism protrusions are formed over the whole effective light-emission area of the outgoing surface 511 (a case where no planar surface portions are present in the effective light-emission area).

As shown in FIG. 14, in the case where prism protrusions are formed over the whole effective light-emission area of the outgoing surface 511, light incident from the LEDs 6 enters inside of the light guide plate 501 through the incident surface 510, being repeatedly reflected and refracted therein, and then most of the light is outputted from the outgoing surface 511 in a state of being converged to a frontal direction of the outgoing surface 511. Therefore, as compared with the case where no prism protrusions are formed in the outgoing surface 511, the quantity of outgoing light outputted to unnecessary ranges in split light emission decreases, so that straightness of light is improved and the split light-emission property is improved. However, even in such a case, there occur such hot spots and bright/dark lines as described above.

Figure 15:
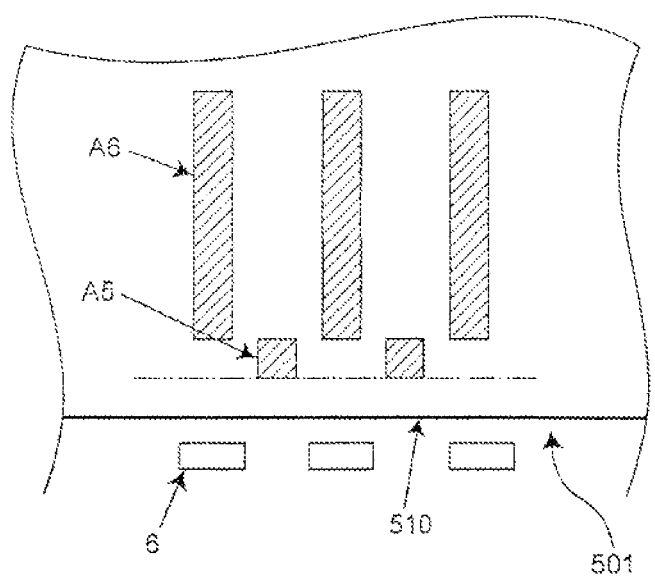
FIG. 15 is a top view showing hot-spot and bright/dark-line occurrence positions in the light guide plate in which prism protrusions are formed all over the effective light-emission area in the outgoing surface, according to Embodiment 1 of the invention.

FIG. 15 shows hot spots A5 and bright lines A6 occurring in the case where prism protrusions are formed all over the effective light-emission area of the outgoing surface 511. In such a case where prism protrusions are formed uniformly, unlike the case where no prism protrusions are formed, as shown in FIG. 15, light is totally reflected at places near the frontal directions of the LEDs 6 (corresponding to the above-described A3 parts) while light is not totally reflected but extracted from the outgoing surface at A5 parts away from the frontal directions of the LEDs 6. Therefore, the hot spots A5 occur at positions shifted from the frontal directions of the LEDs 6 as shown in FIG. 15. On the other hand, the bright lines A6 occur in the frontal directions of the LEDs 6 regardless of the presence or absence of prism protrusions. As the placement pitch of the LEDs increases or the total luminous flux per LED increases, there arise even larger darkness-and-brightness differences between regions of the hot spots A5 or the bright lines A6 and their surrounding regions.

(In a Case where Both Prism-Protrusion Present Portions and Absent Portions are Included in the Effective Light-Emission Area of Outgoing Surface 11)

As shown in FIG. 9, in the light guide plate 1, planar surface portions are absent and prism protrusions alone are present in the second diffusion-and-propagation region 11*d*, whereas both prism-protrusion present portions and absent portions (planar surface portions) are included in the propagation auxiliary region 11*b* and the first diffusion-and-propagation region 11*c*, those present and absent portions being formed alternately in the X direction.

Figure 16:
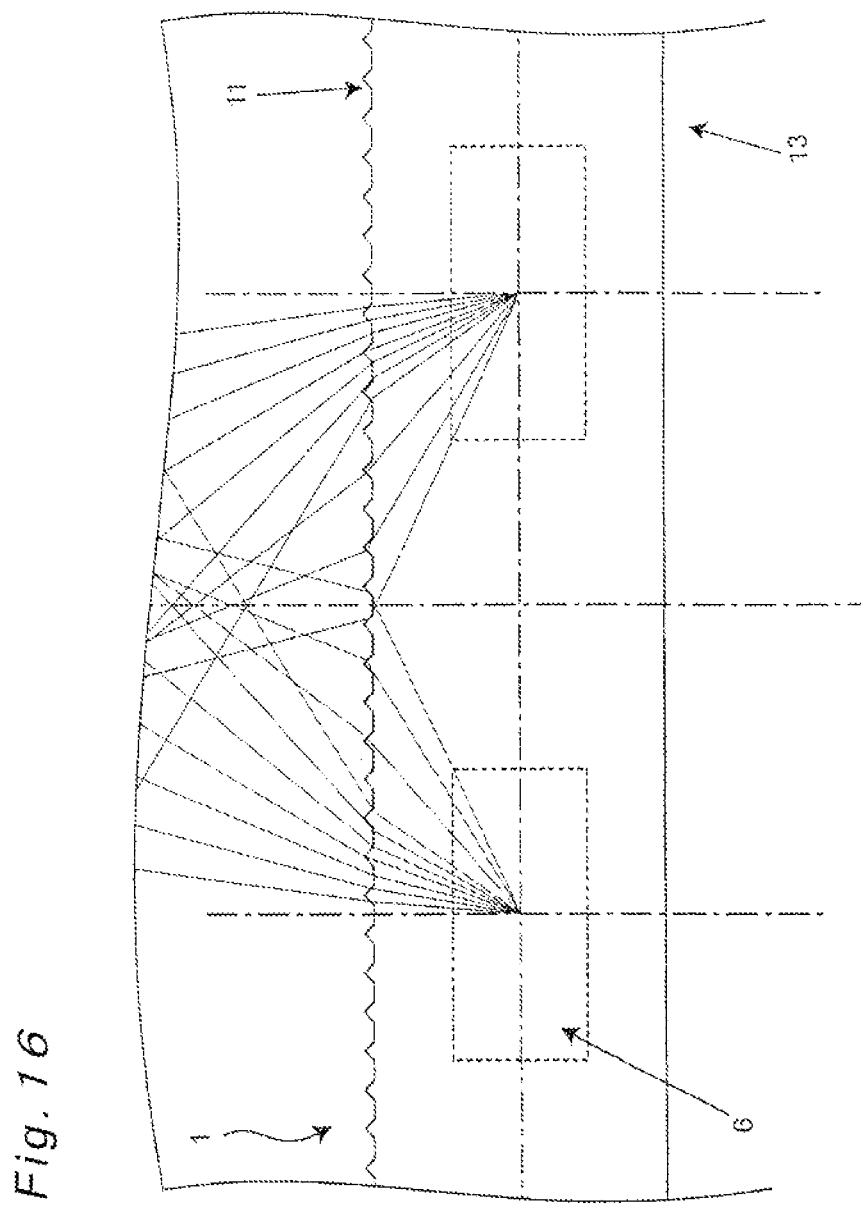
FIG. 16 is an optical path diagram of the light guide plate in which both presence and absence portions of prism protrusions are included in the effective light-emission area of the outgoing surface, according to Embodiment 1 of the invention.

FIG. 16 shows an optical path diagram resulting when the propagation auxiliary region 11*b* and the first diffusion-and-propagation region 11*c* are viewed in a cross section (XZ cross section) parallel to an incident surface 10. In the propagation auxiliary region 11*b* and the first diffusion-and-propagation region 11*c*, in which prism protrusions are formed, the straightness of light is improved and the split light-emission property is improved, as compared with the case where no prism protrusions are formed.

Besides, hot spots and bright/dark lines are discerned by intensity or weakness of light, and hot-spot occurrence positions differ depending on presence or absence of the prism protrusions. Therefore, the prism protrusions formed in the propagation auxiliary region 11*b* and the first diffusion-and-propagation region 11*c* are varied in height smoothly from a certain range so that slope angles of the prism protrusions are varied to control the outgoing directions of light, allowing uniformization of light intensity to be achieved. By doing so, occurrence of hot spots and bright/dark lines can be prevented.

More specifically, referring to FIG. 10, prism height of the propagation auxiliary region 11*b* and the first diffusion-and-propagation region 11*c* is increased more and more with increasing distance from the incident surface 10 (in the Y direction), while prism height of the second diffusion-and-propagation region 11*d* is constant. In Embodiment 1, a height H1 at a border between the propagation auxiliary region 11*b* and the first diffusion-and-propagation region 11*c* is set to 15 μm, and a height H2 of the second diffusion-and-propagation region 11*d* is set to 50 μm. Also, lengths L11*a*, L11*b*, L11*c* and L11*d* satisfy a relationship "L11*b*≤L11*a*≤L11*c*<L11*d*". The lengths L11*a*, L11*b* and L11*c* primarily have a role of preventing occurrence of hot spots and bright/dark lines of the outgoing surface 11 while the length L11*d* primarily has a role of controlling viewing-angle characteristics of the light guide plate 1.

The roles of L11*a*, L11*b*, L11*c*, L11*d* are explained in more detail. L11*a* has a role of preventing occurrence of hot spots due to the LED placement pitch and the directivity of the LEDs as well as effects of expansion and contraction of the light guide plate due to influences of heat from the light source. L11*b* has a role of assisting L11*c* to suppress the occurrence of hot spots, so being more effective in cases where the directivity of the LEDs is strong. L11*c* serves not only for suppressing hot spots and bright/dark lines but also for hiding discernable borderlines by presence or absence of prism protrusions with slopes formed in the prism protrusions so that image quality can be improved. With the length L11*d*, the outgoing direction of light in ranges where no hot spots or bright/dark lines occur can be converged to the frontal direction.

In Embodiment 1, a gradient of L11*b* is set larger than a gradient of L11*c*. Lengths of L11*a*, L11*b*, and L11*c* are set to about 7.5 mm, about 2 mm, and about 30 mm, respectively. Also, the length of L11*a* may be made shorter and shorter with decreasing LED placement pitch, while the length of L11*a* is made longer and longer with increasing LED placement pitch. Lengths of H1, L11*b*, L11*c* are also changed as required depending on the LED placement pitch and the total luminous flux per LED. In Embodiment 1, it approximately holds that L11*a*:L11*b*:L11*c*:L11*d*=4:1:15:200. Also, as shown in FIG. 11, a prism-shape placement pitch P in the outgoing surface 11 is set to 100 μm, and its apex angle θ4 is set to about 90°.

As described above, according to the light guide plate 1 of Embodiment 1, the propagation region 11*a*, which is a flat surface portion, serves for suppressing expansion and contraction of the light guide plate due to heat from the light source and further suppressing occurrence of hot spots by placement of them outside the effective light-emission area. In the propagation auxiliary region 11b and the first diffusion-and-propagation region 11c, prism protrusions with slopes formed therein are formed so as to be mixed with planar surface portions, thereby uniformizing outgoing light, so that occurrence of hot spots is suppressed and moreover the discernibility of borderlines of the prism protrusions is lowered, thereby improving the image quality. Further, the second diffusion-and-propagation region 11d, in which prism protrusions are formed all over, serves for converging the outgoing direction of light to the frontal direction. By setting the individual prism protrusions as shown above, hot spots and bright/dark lines can be suppressed without impairing the split light-emission property and the light use efficiency.

Embodiment 2

A surface light source device according to Embodiment 2 of the invention is described below with reference to FIGS. 17 to 21.

Figure 17:
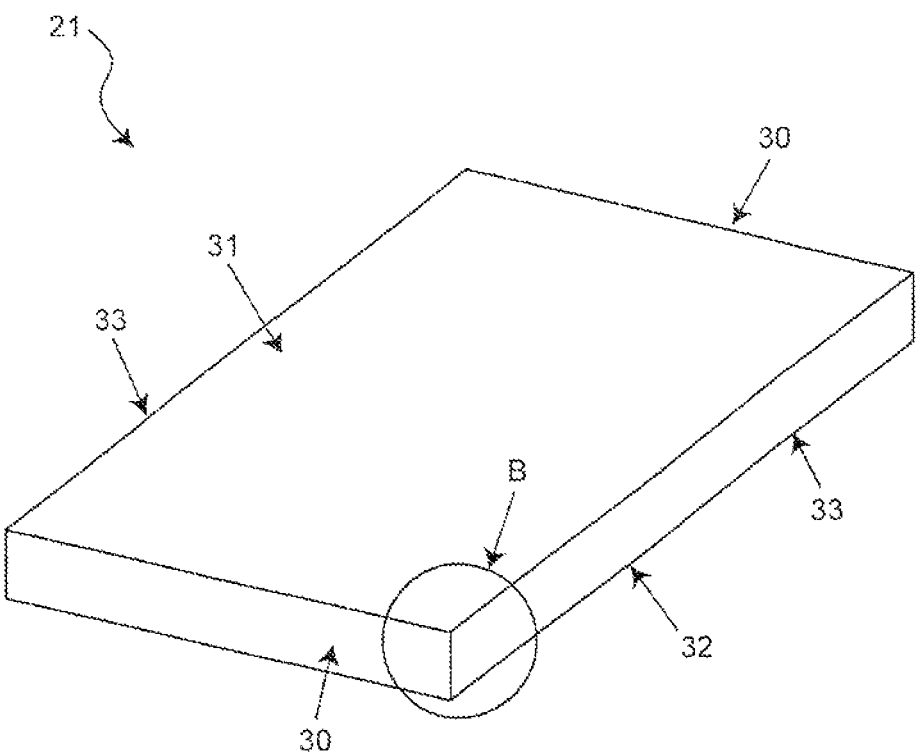
FIG. 17 is a perspective view of a light guide plate according to Embodiment 2 of the invention.

The surface light source device according to this Embodiment 2 differs from the surface light source device of Embodiment 1 only in the configuration of an outgoing surface 31 of a light guide plate 21, the rest of the structure being similar to that of Embodiment 1. More specifically, two groups of prism protrusions are provided, and a placement ratio of those groups is changed depending on the LED placement pitch and the total luminous flux per LED. FIG. 17 shows the light guide plate 21 according to this Embodiment 2, and FIGS. 18 and 19 are a perspective view and a top view, respectively, of B part of FIG. 17 in the light guide plate 21.

Figure 18:
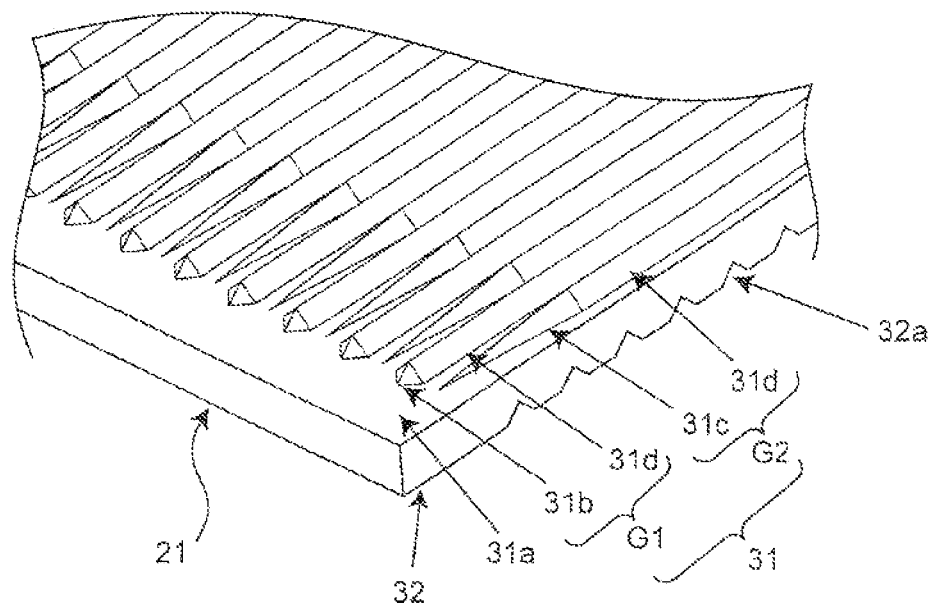
FIG. 18 is a perspective view of B part of the light guide plate according to Embodiment 2 of the invention.

As shown in FIG. 18, the two groups of prism protrusions are a prism-protrusion group G1 including a propagation auxiliary region 31b and a second diffusion-and-propagation region 31d and having a role of controlling the outgoing direction of light from the light guide plate 21, and a prism-protrusion group G2 including a first diffusion-and-propagation region 31c and a second diffusion-and-propagation region 31d. By changing the placement ratio of these prism-protrusion groups G1, G2, it becomes possible to locally change the outgoing direction of light, thus making it practicable to improve the split light-emission property and suppress hot spots and bright/dark lines. Details of the prism protrusions will be described later.

Figure 19:
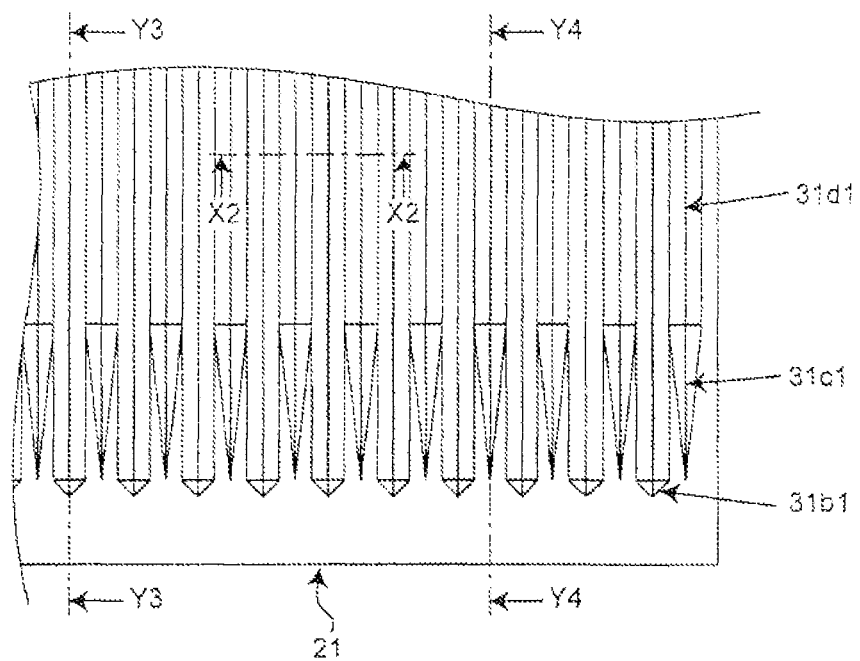
FIG. 19 is a top view of B part of the light guide plate according to Embodiment 2 of the invention.

As shown in FIG. 19, in the prism-protrusion group G1, a prism ridge 31b1 formed in the propagation auxiliary region 31b and a prism ridge 31d1 formed in the second diffusion-and-propagation region 31d are connected to each other. Similarly, in the prism-protrusion group G2, a prism ridge 31c1 formed in the first diffusion-and-propagation region 31c and the prism ridge 31d1 formed in the second diffusion-and-propagation region 31d are also connected to each other.

Figure 20:
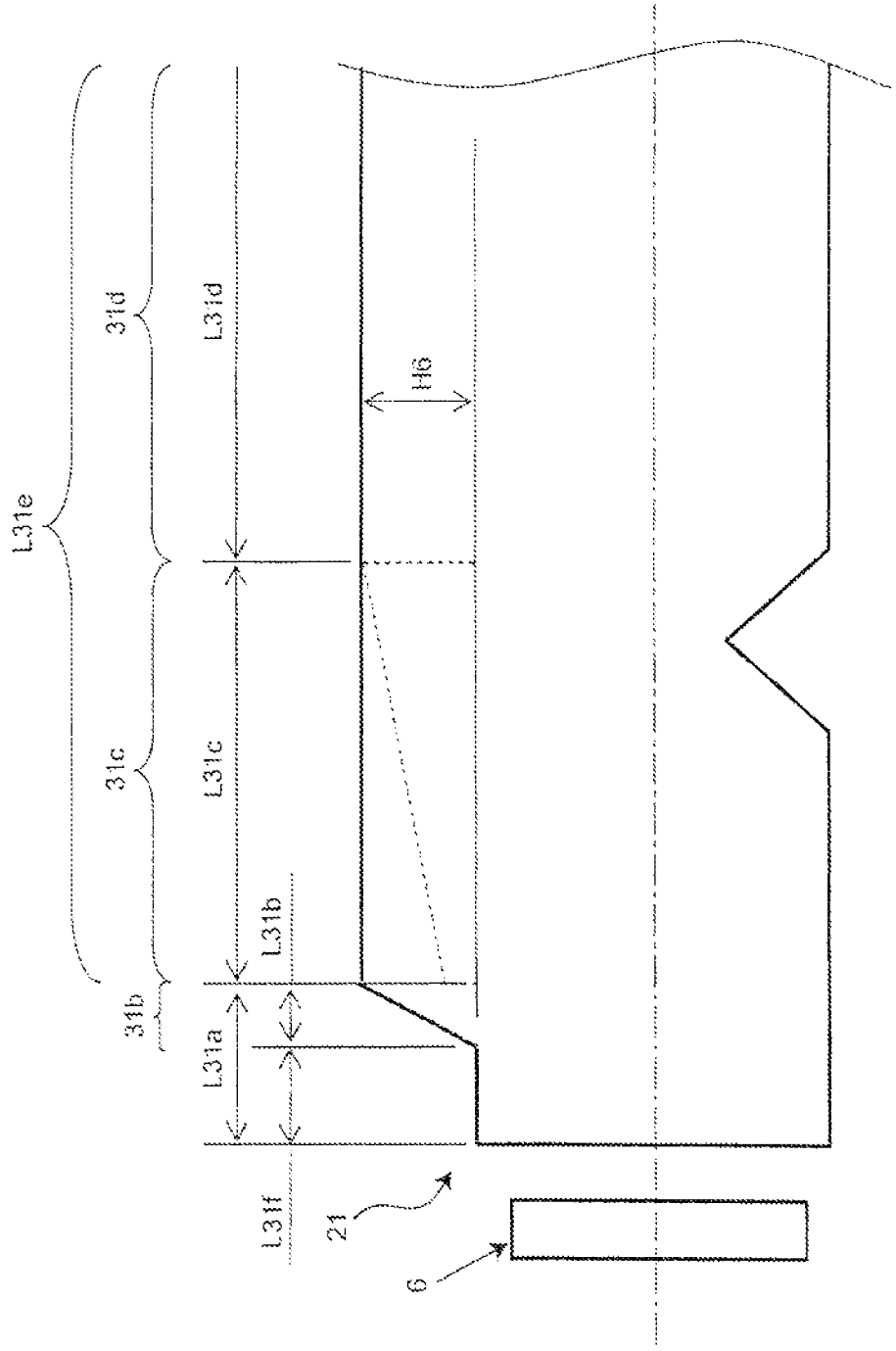
FIG. 20 is a sectional view of the light guide plate, taken along the line Y3-Y3, according to Embodiment 2 of the invention.
Figure 21:
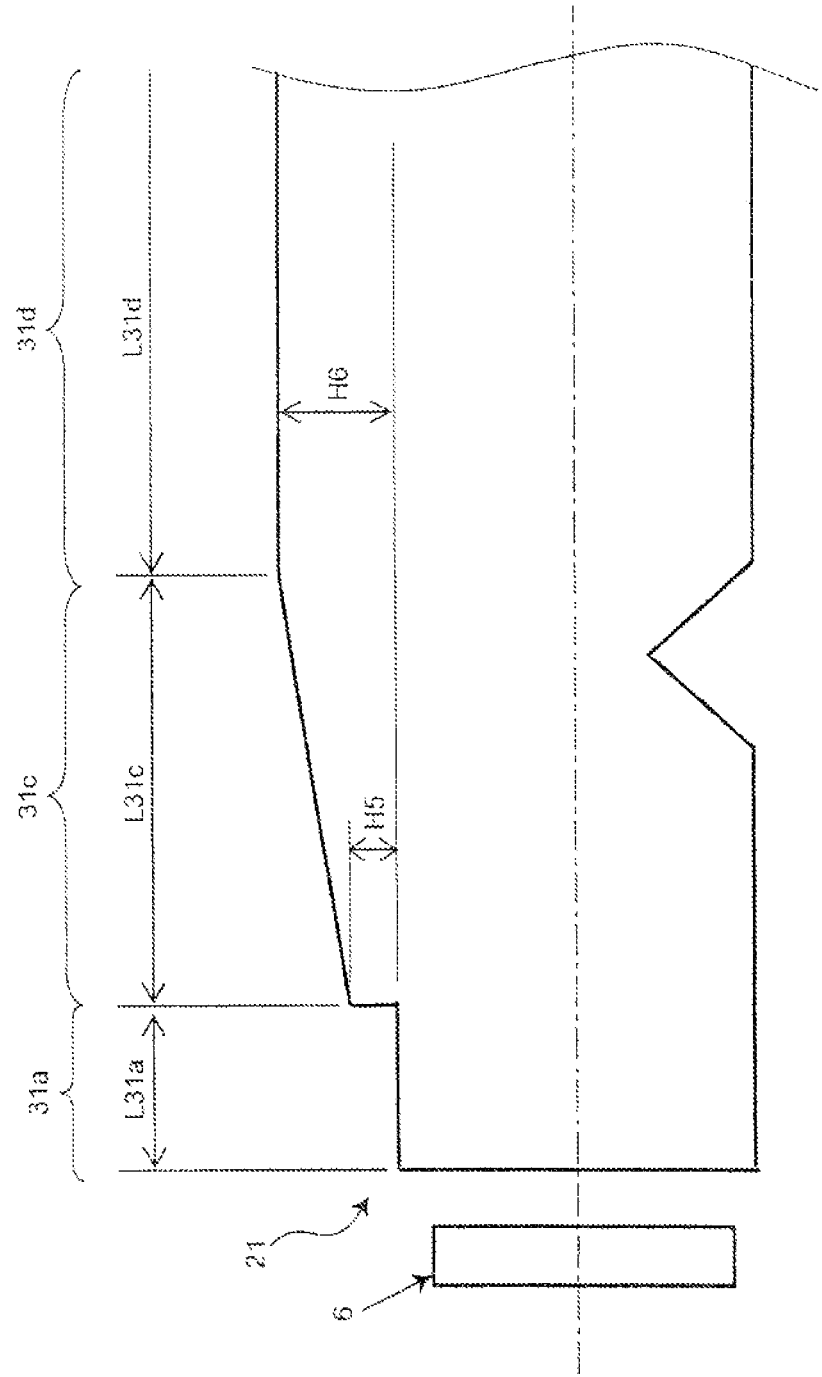
FIG. 21 is a sectional view of the light guide plate, taken along the line Y4-Y4, according to Embodiment 2 of the invention.

FIG. 20 is a sectional view taken along the line Y3-Y3 of FIG. 19 (prism-protrusion group G1), and FIG. 21 is a sectional view taken along the line Y4-Y4 of FIG. 19 (prism-protrusion group G2). Cross sections in the Y-Y directions of FIG. 19 are similar in configuration to those of Embodiment 1.

With reference to FIG. 20, prism-protrusion shape of the prism-protrusion group G1 is explained. As shown in FIG. 20, the prism height of the propagation auxiliary region 31b is increased more and more with increasing distance from an incident surface 30 (in the Y direction) while the prism height of the second diffusion-and-propagation region 31d is constant. In Embodiment 2, a height H6 of the second diffusion-and-propagation region 31d is set to 50 μm. Also, lengths of L31a, L31b, L31c, L31d, L31e and L31f shown in FIG. 21 satisfy relationships "L31b≤L31a≤L31c<L31d" and "L31e=L31c+L31d" and "L31a=L31b+L31f". L31b and L31f primarily have a role of controlling hot spots and bright/dark lines of the incident surface while L31e primarily has a role of controlling viewing-angle characteristics of the light guide plate. Concrete functions are similar to those shown in Embodiment 1.

Next, with reference to FIG. 21, the prism-protrusion shape of the prism-protrusion group G2 is explained. As shown in FIG. 21, prism height of the first diffusion-and-propagation region 31c is increased more and more with increasing distance from the incident surface 30 while prism height of the second diffusion-and-propagation region 31d is made constant. In Embodiment 2, an initial height H5 of the first diffusion-and-propagation region 31c is set to 0 μm and H6 is set to 50 μm. However, H5 is not limited to 0 μm and may be changed within a range of 1 to 50 μm. Also, lengths of L31a, L31c, L31d satisfy a relationship "L31a≤L31c<L31d". L31a and L31c primarily have a role of controlling hot spots and bright/dark lines of the incident surface 30 while L31d primarily has a role of controlling viewing-angle characteristics of the light guide plate 21.

The placement ratio between prism protrusions having the cross-sectional shape shown in FIG. 20 and prism protrusions having the cross-sectional shape shown in FIG. 21 (the ratio is 1:1 in FIG. 18) and the lengths of H5, H6, L31b and L31c are changed as required depending on changes in the LED placement pitch and the total luminous flux per LED. By doing so, even more uniformization of light intensity can be achieved, so that hot spots and bright/dark lines can be suppressed without impairing the split light-emission property and the light use efficiency.

Embodiment 3

A surface light source device according to Embodiment 3 of the invention is described with reference to FIGS. 33, 34A, 34B and 35.

Figure 33:
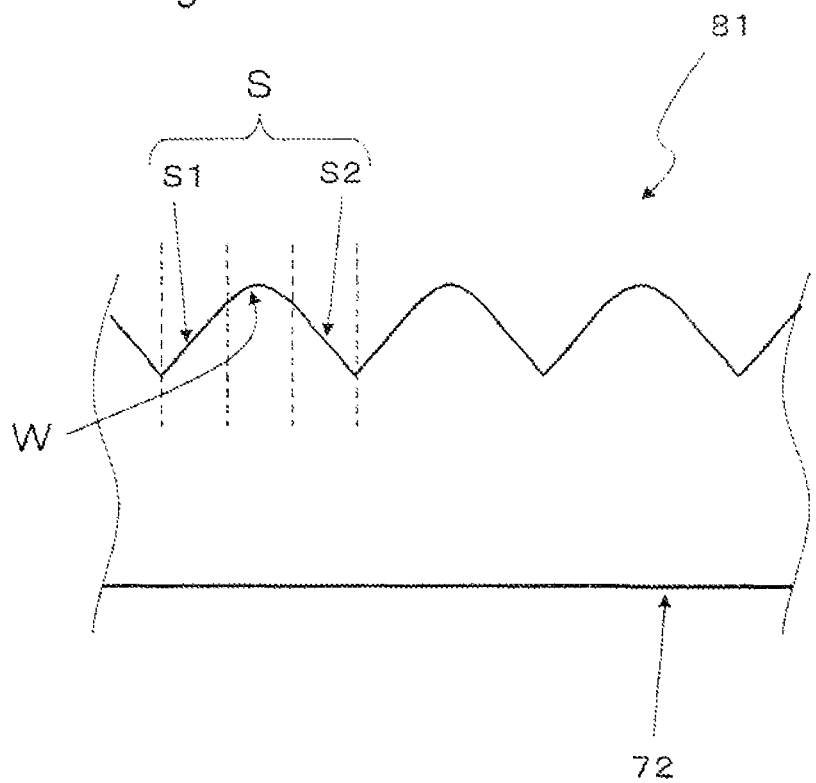
FIG. 33 is a sectional view of a light guide plate according to Embodiment 3 of the invention.

The surface light source device of this Embodiment 3 differs from the surface light source device of Embodiment 1 only in the configuration of prism protrusions of the light guide plate, the rest of the structure being similar to that of Embodiment 1. More specifically, bent portions W are formed at upper ends of prism protrusions placed in the individual regions in this Embodiment 3. FIG. 33 shows a cross section of prism protrusions of a light guide plate 81 according to this Embodiment 3.

As shown in FIG. 33, as viewed in a cross section of the light guide plate 81 orthogonal to a prism-protrusion extending direction, the bent portions W are formed at upper ends of the prism protrusions, and side face portions of the prism protrusions except the bent portions W are formed as linear portions S (linear portions S1 and S2). Each prism protrusion is adjacent to its neighboring prism protrusions at the linear portions S.

According to Embodiment 3, by the bent portions W being formed at upper ends of the prism protrusions, the outgoing direction of light outputted from the light guide plate 81 becomes more easily diffusible. Therefore, compared with the case where the prism protrusions are formed only by the linear portions S as shown in FIG. 11, variations in luminance can be lessened so that the luminance can be uniformized.

A comparison is made below between luminances resulting from split light emission applied to the light guide plate 81 having prism protrusions of the above-described structure and luminances resulting from split light emission applied to the light guide plate 1 according to Embodiment 1.

Figure 34A:
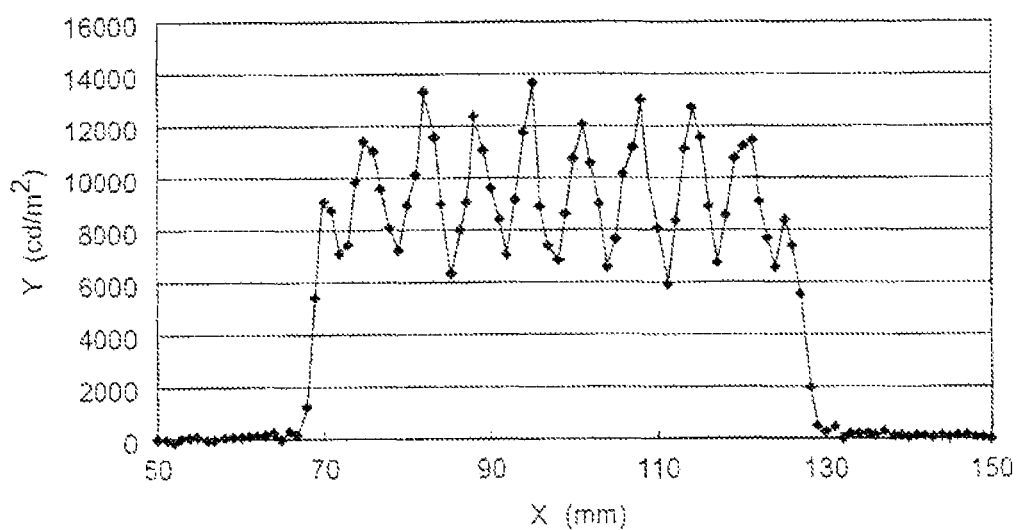
FIG. 34A is a chart showing luminances resulting from split light emission performed by the light guide plate according to Embodiment 3 of the invention.
Figure 34B:
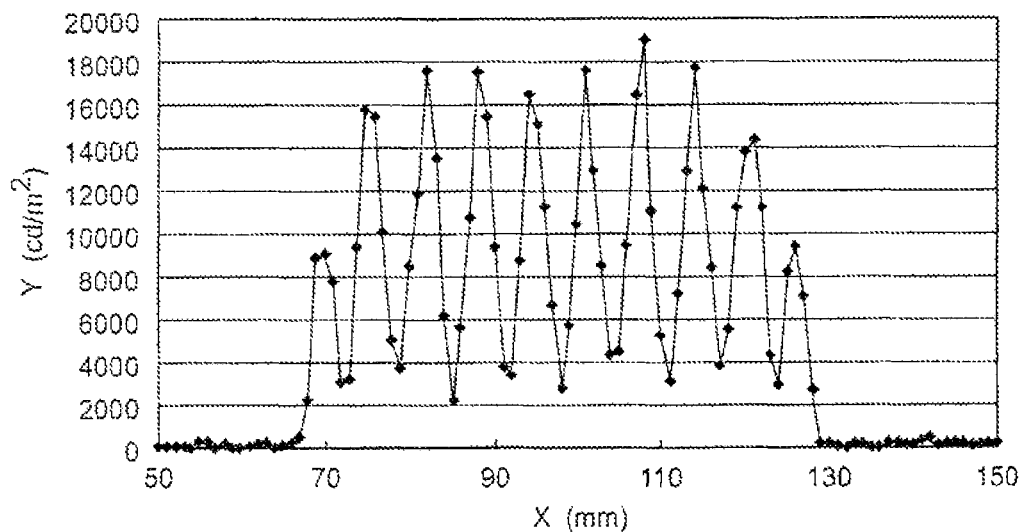
FIG. 34B is a chart showing luminances resulting from split light emission performed by the light guide plate according to Embodiment 1 of the invention.
Figure 35:
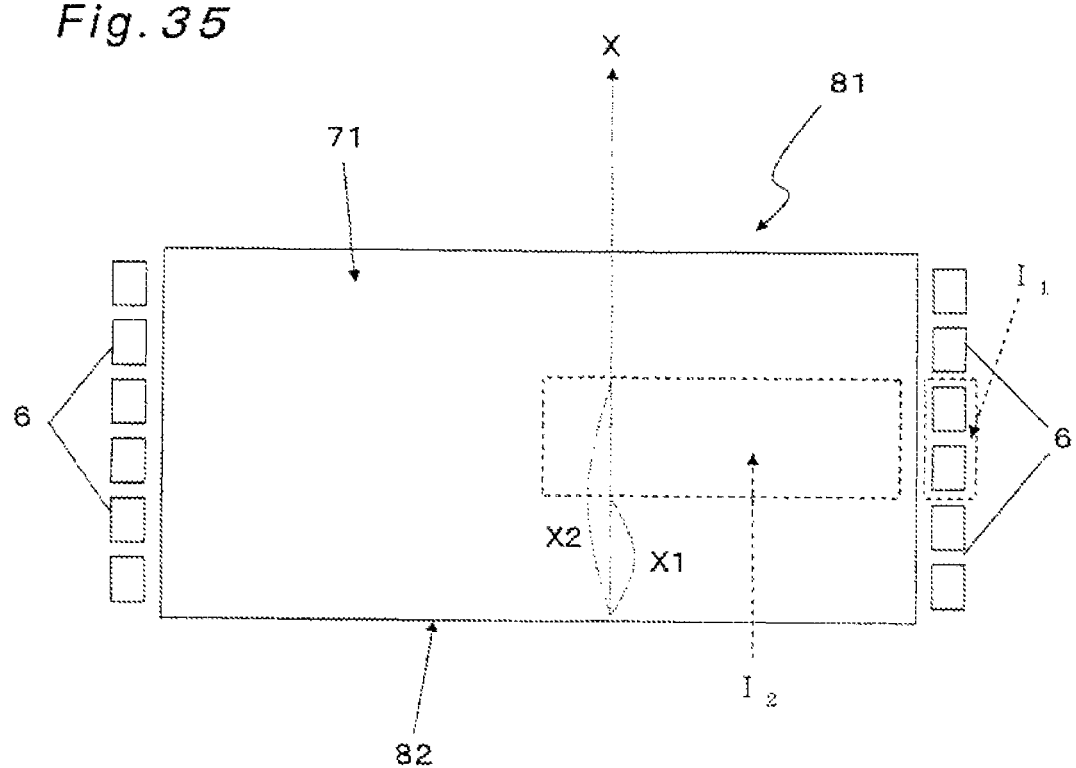
FIG. 35 is a top view of the light guide plate according to Embodiment 3 of the invention.

FIG. 34A shows front luminances resulting from split light emission applied to the light guide plate 81 (FIG. 33) of Embodiment 3, while FIG. 34B shows front luminances resulting from split light emission applied to the light guide plate 1 (FIG. 11) of Embodiment 1. Both FIGS. 34A and 34B show luminances resulting from split light emission of a specific split-light-emission range $l_2$, which was fulfilled by light emission of particular LEDs 6 placed in a light-emitting part $l_1$ so that an average front luminance would become 10000 cd/m$^2$ as shown in FIG. 35. The X axis in FIG. 34A represents distances (mm) from a side face 82 of the light guide plate 81 shown in FIG. 35 while the Y axis in FIG. 34A represents front luminances (cd/m$^2$) measured from the front side. It is noted that an upper-end angle of the prism protrusions (an angle formed by two linear portions) of the light guide plate 1 in Embodiment 1 is set to 90°.

As shown in FIG. 34A, in the light guide plate 81 according to this Embodiment 3, a maximum value of luminance differences (maximum luminance difference) in the split light-emission range $l_2$ (in which X is, for example, 70 mm (X1) to 130 mm (X2)) is about 10000 cd/m$^2$. In contrast to this, as shown in FIG. 34B, in the light guide plate 1 according to Embodiment 1, the maximum luminance difference is about 16000 cd/m$^2$. As apparent from this result, according to the light guide plate 81 of Embodiment 3, by the bent portions W formed at the upper ends of the prism protrusions, variations in luminance can be lessened, as compared with the case where the prism protrusions are formed only by the linear portions S as in Embodiment 1. Thus, the uniformization of luminance can be realized.

Further, a relationship between a ratio $W_1/S_1$ of a length $W_1$ of the bent portions W in a cross section orthogonal to the prism-protrusion extending direction to a length $S_1$ of the linear portions S in the same cross section, and the maximum luminance difference of the light guide plate, is shown in Table 1. In Table 1, Example 3 corresponds to this Embodiment 3, and Example 5 corresponds to Embodiment 1.

TABLE 1

|  | Example 1 | Example 2 | Example 3 | Example 4 | Example 5 |
|---|---|---|---|---|---|
| $W_1/S_1$ | 1 | 0.6 | 0.3 | 0.2 | 0 |
| Maximum luminance difference (cd/m$^2$) | 4000 | 6000 | 10000 | 14000 | 16000 |

As can be understood from Table 1, with the ratio $W_1/S_1$ equal to or more than 0.3, the maximum luminance difference can be set to not more than 10000 (cd/m$^2$), so that the uniformization of luminance can be achieved. On the other hand, with the ratio $W_1/S_1$ beyond 1, the outgoing-direction spread of light becomes so large that light may be outputted to an unnecessary range, leading to worsened split light-emission property. Thus, it can be understood that the value of $W_1/S_1$ is preferably within a range from 0.3 to 1.0 in terms of split light-emission property.

This Embodiment 3 has been described on a case where bent portions are formed in the individual prism protrusions, respectively. However, the case may be another in which, for example, prism protrusions formed only by bent portions and prism protrusions formed only by linear portions are included respectively so that bent portions and linear portions are mixedly provided as a whole.

Also, this Embodiment 3 has been described on a case where the prism protrusions in the individual regions including the propagation auxiliary region, the first diffusion-and-propagation region and the second diffusion-and-propagation region have bent portions. However, without being limited to this, the case may be another in which, for example, bent portions are formed only in prism protrusions of some regions, while no bent portions are formed and only linear portions are formed in prism protrusions of the other regions.

As described above, according to the invention, in an edge-light type backlight, the configuration of the outgoing surface in vicinities of the incident surface from the LEDs is changed depending on the number of LEDs in use and the LED placement pitch. As a result of this, light can be efficiently extracted from LEDs under electric power saving without impairing the light use efficiency and without depending on the placement interval of the LEDs and moreover without impairing the split light-emission property, with use of necessary minimum numbers of LEDs. Furthermore, by eliminating hot spots and bright/dark lines, there can be realized a light guide plate prevented from impairment of light uniformity. Besides, the split light-emission property can be improved by about 25% in characteristics of the shorter-side direction of the light guide plate.

It is noted that the present invention is not limited to the foregoing embodiments, and may be carried out in other various aspects. For example, in the above Embodiments 1 and 2, a structure including no propagation auxiliary regions 11b, 31b may also be adopted.

Figure 22:
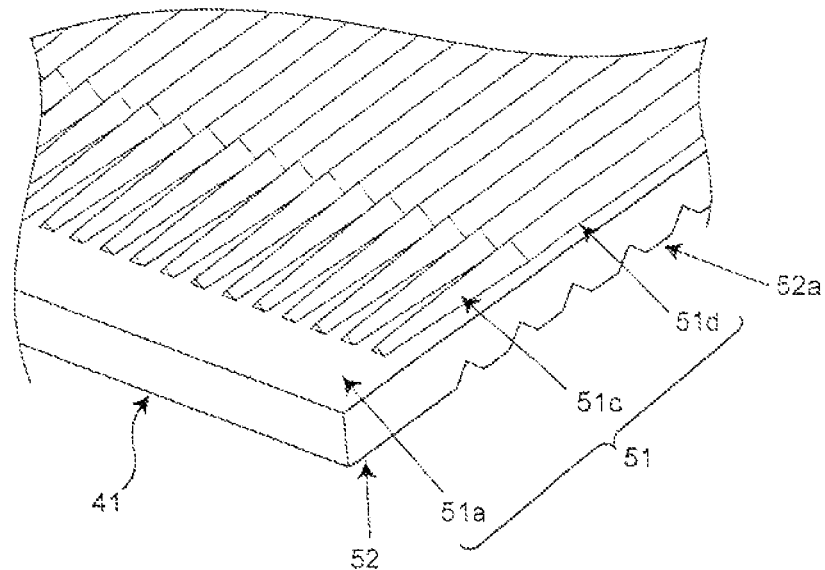
FIG. 22 is a perspective view of a light guide plate according to a modification of Embodiment 1 of the invention.
Figure 23:
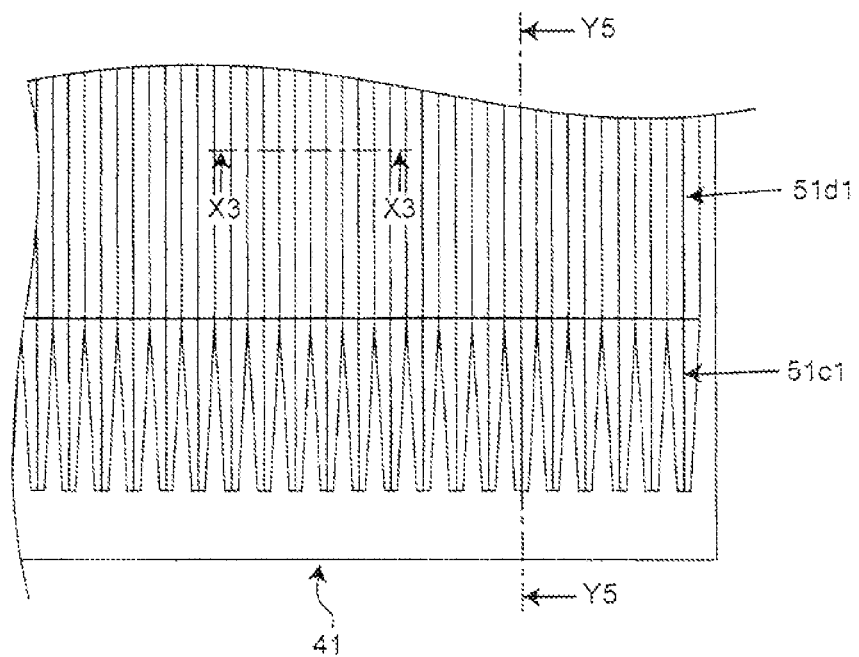
FIG. 23 is a top view of the light guide plate according to the modification of Embodiment 1 of the invention.
Figure 24:
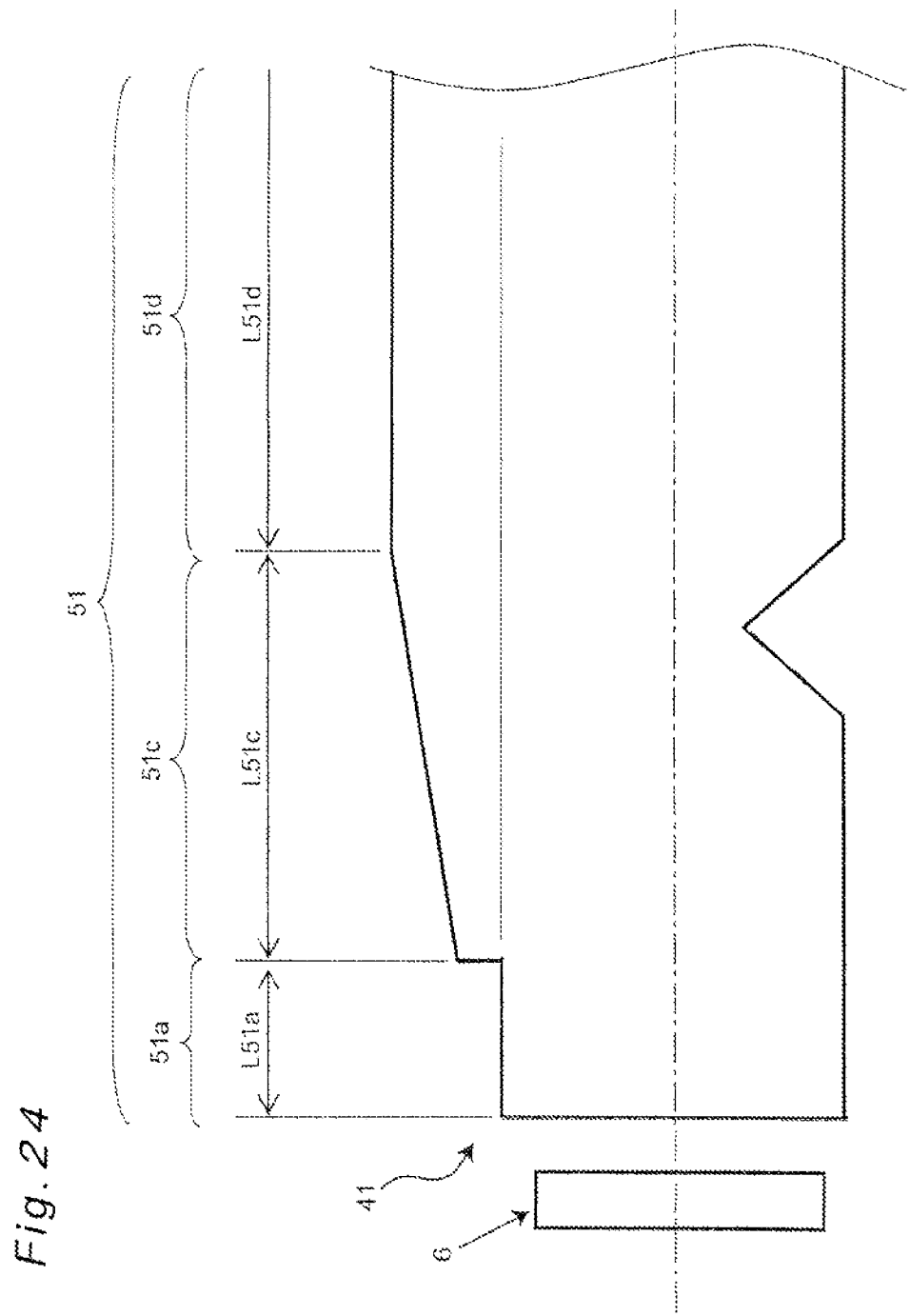
FIG. 24 is a sectional view of the light guide plate, taken along the line Y5-Y5, according to the modification of Embodiment 1 of the invention.

FIGS. 22 and 23 are a perspective view and a top view, respectively, of a light guide plate 41 according to a modification of Embodiment 1 with the propagation auxiliary region 11b eliminated. FIG. 24 is a sectional view of the light guide plate 41 taken along the line Y5-Y5 of FIG. 23. The sectional view of the light guide plate 41 taken along the line X3-X3 of FIG. 23 is similar to FIG. 11 according to Embodiment 1.

Figure 25:
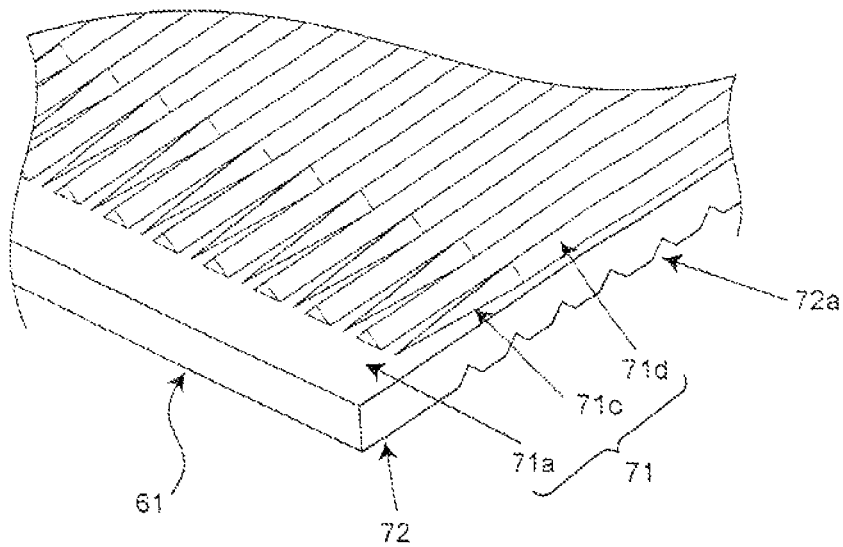
FIG. 25 is a perspective view of a light guide plate according to a modification of Embodiment 2 of the invention.
Figure 26:
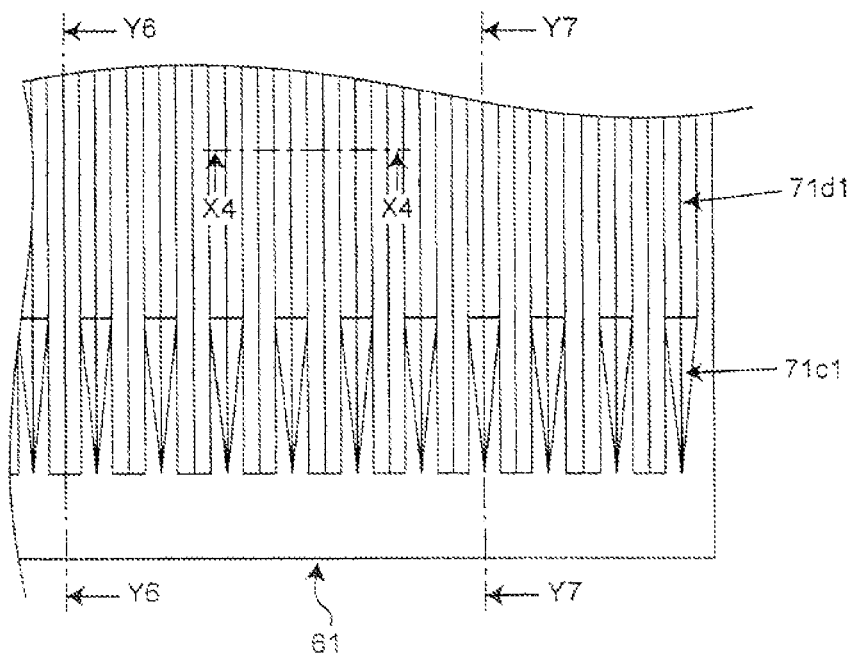
FIG. 26 is a top view of the light guide plate according to the modification of Embodiment 2 of the invention.
Figure 27:
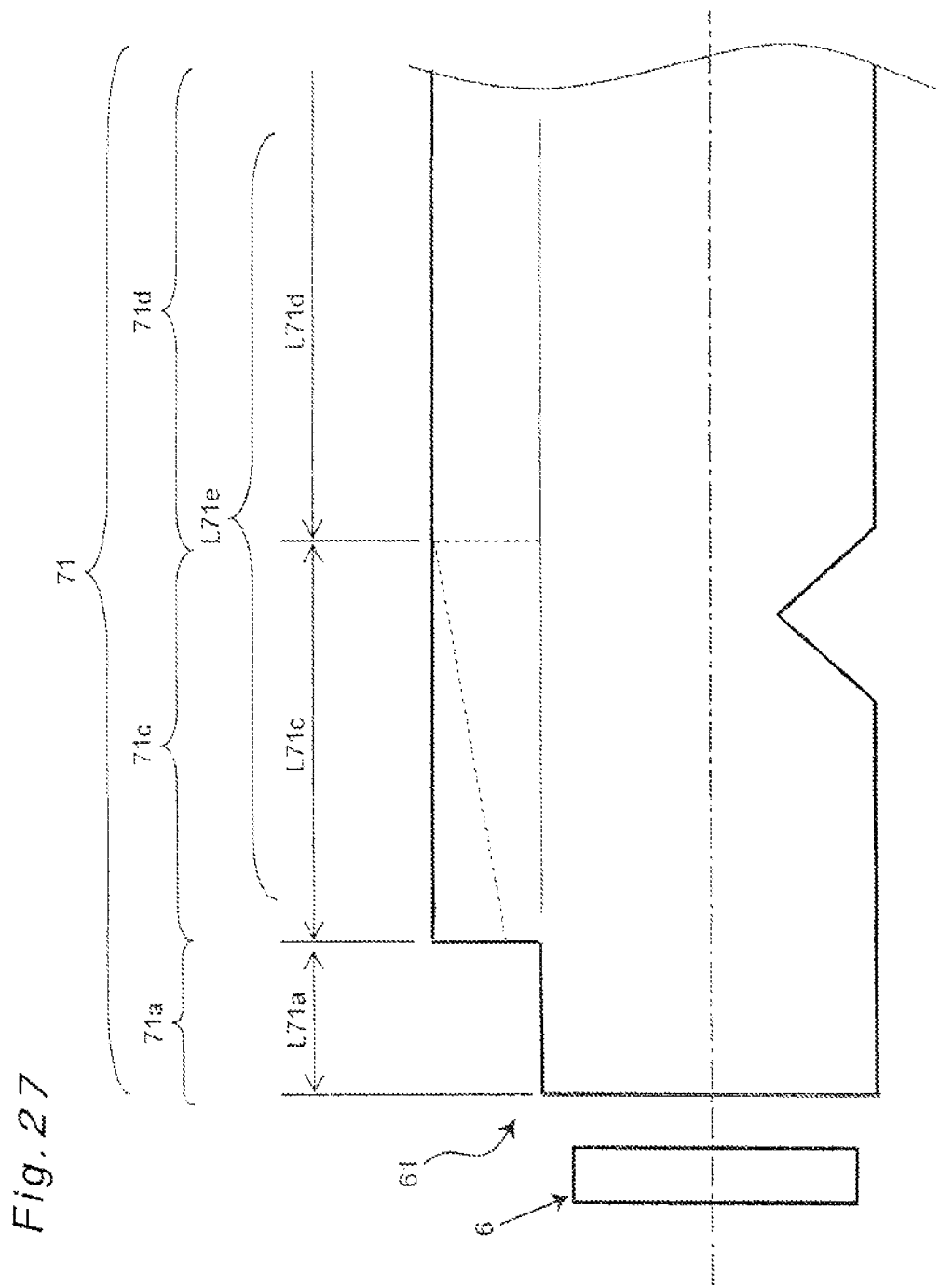
FIG. 27 is a sectional view of the light guide plate, taken along the line Y6-Y6, according to the modification of Embodiment 2 of the invention.
Figure 28:
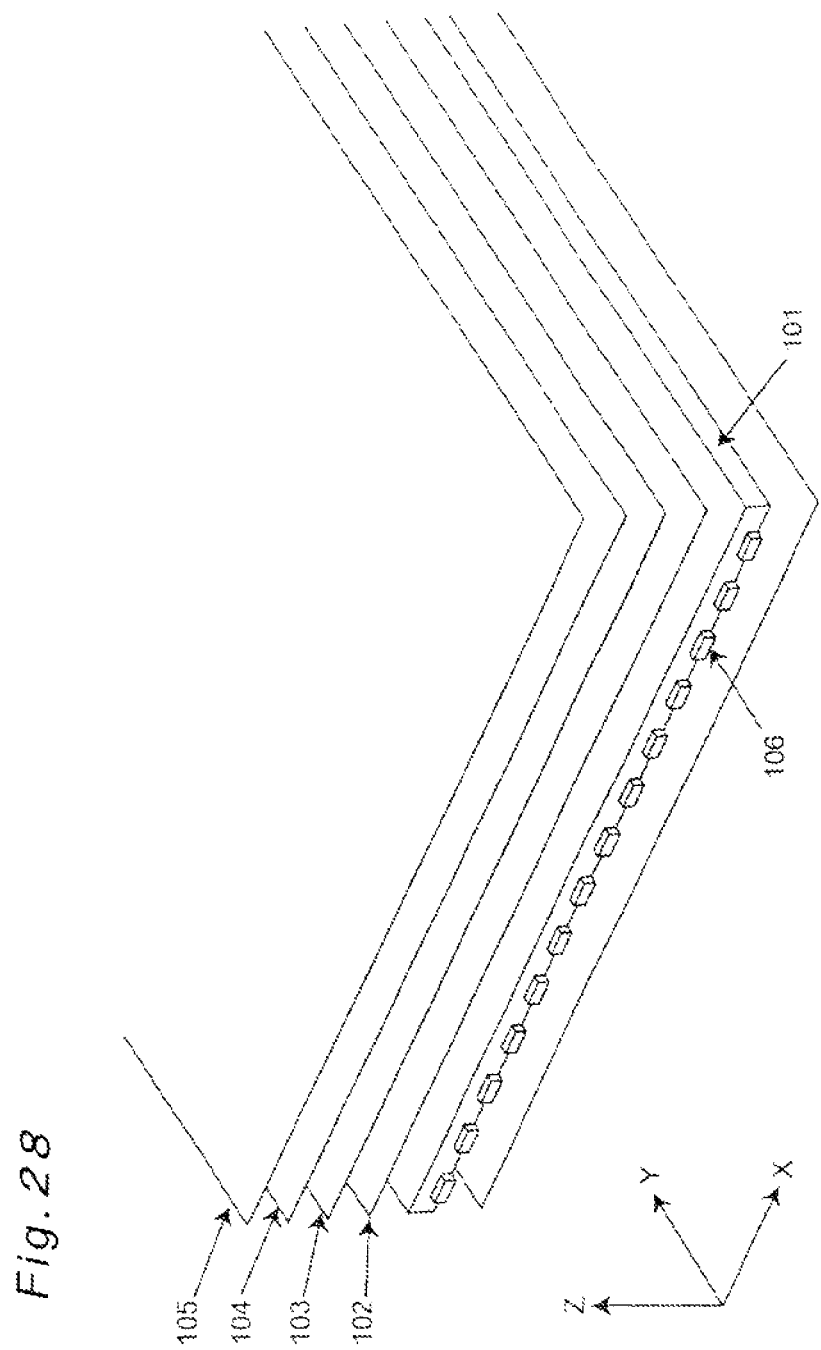
FIG. 28 is a perspective view of an edge-light type backlight unit according to a prior art in which LEDs are adopted.
Figure 29:
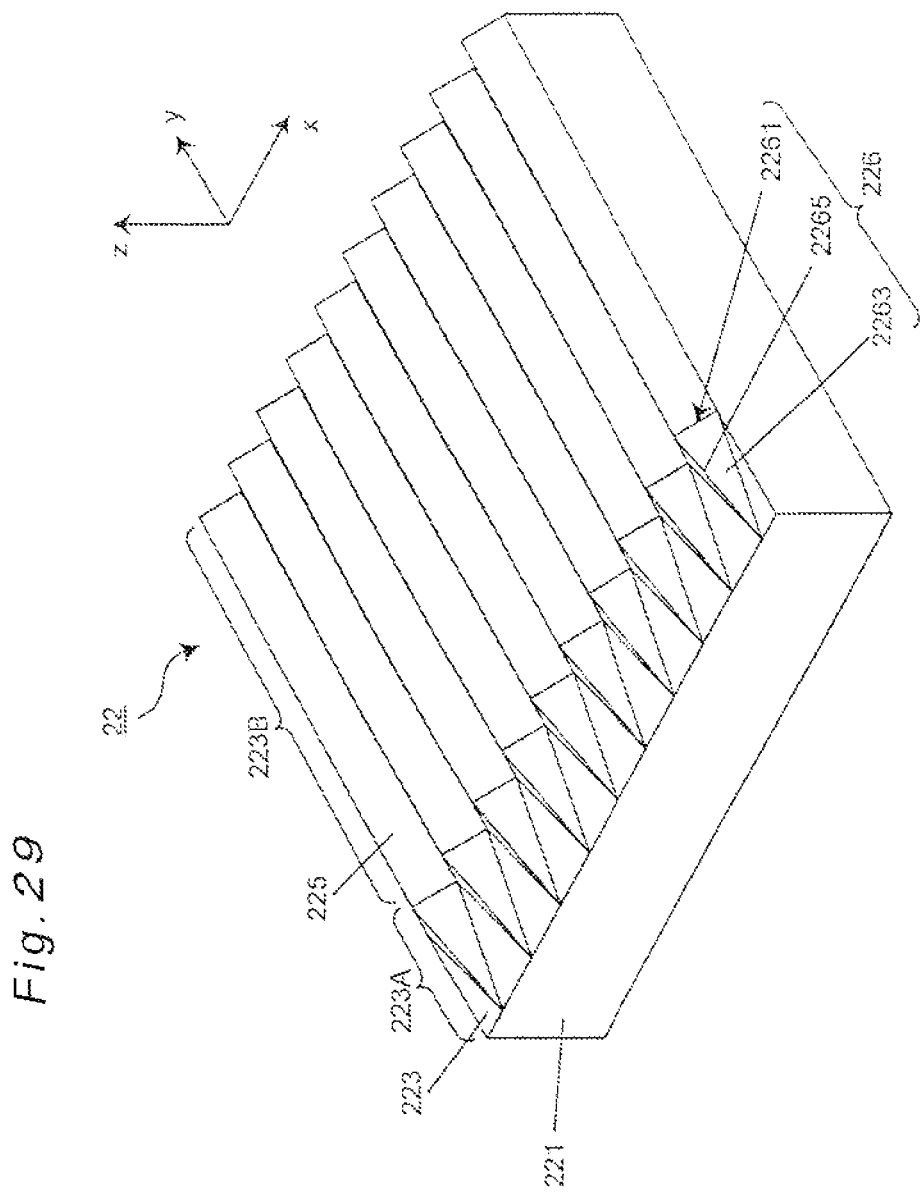
FIG. 29 is a perspective view of a light guide plate according to a prior art.
Figure 30:
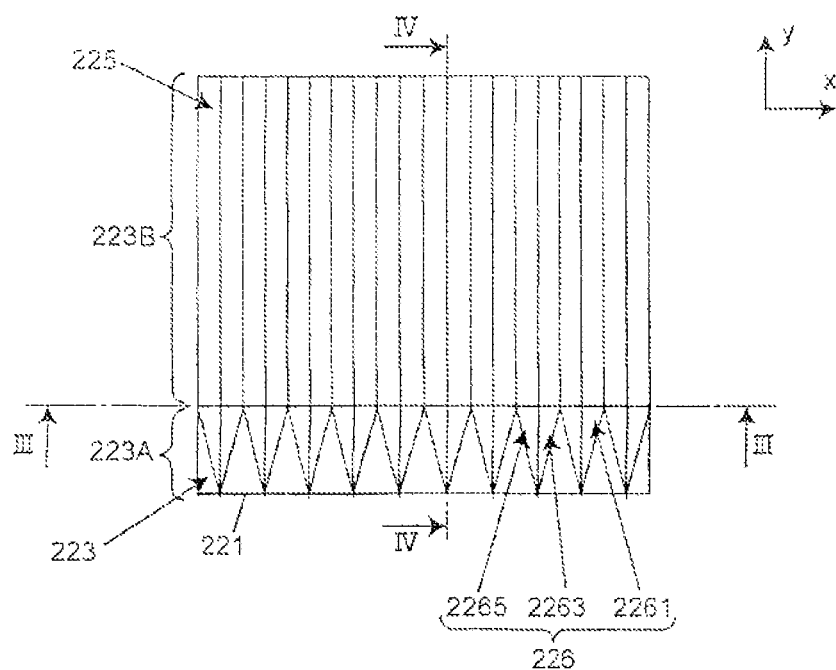
FIG. 30 is a top view of the light guide plate according to the prior art.
Figure 31:
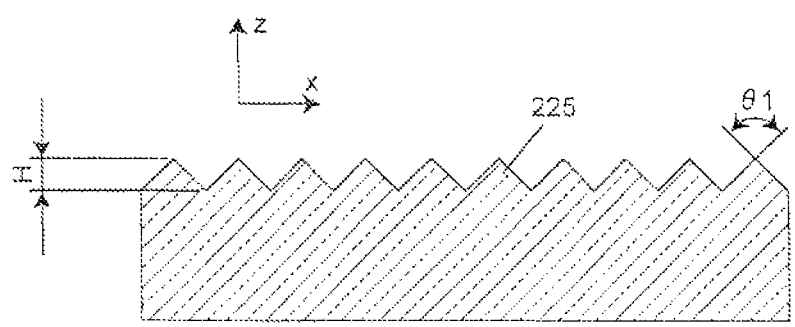
FIG. 31 is a III-III sectional view of the light guide plate according to the prior art.
Figure 32:
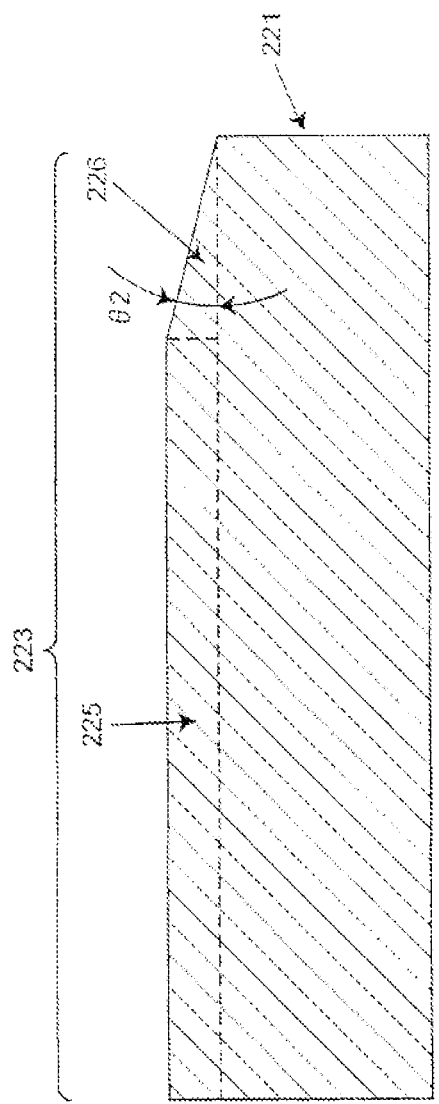
FIG. 32 is a IV-IV sectional view of the light guide plate according to the prior art.

Furthermore, FIGS. 25 and 26 are a perspective view and a top view, respectively, of a light guide plate 61 according to a modification of Embodiment 2 with the propagation auxiliary region 31b eliminated. FIG. 27 is a sectional view of the light guide plate 61 taken along the line Y6-Y6 of FIG. 26. As in the above case, the sectional view of the light guide plate 61 taken along the line X4-X4 of FIG. 26 is similar to FIG. 11 according to Embodiment 1.

The above modifications are similar to Embodiments 1 and 2 except that the propagation auxiliary regions 11b, 31b are eliminated, and so detailed description of the individual constituent elements is omitted. The propagation auxiliary regions 11b, 31b placed outside the effective light-emission area are small ranges relative to the effective light-emission area, not largely affecting the quality of the light guide plates 1, 21. However, with the structure in which the propagation auxiliary regions 11b, 31b are not formed, it becomes possible to prevent minute losses of light that occur in the propagation auxiliary regions 11b, 31b.

Further, the foregoing embodiments and modifications have been described on a case where each prism ridge of the prism protrusions is formed as a straight line as viewed in a YZ cross section. However, the case may be another in which the prism ridges are formed as curved lines including straight lines. Also, the embodiments and modifications have been described on a case where the cross-sectional shape of the prism protrusions in a cross section parallel to the incident surface is V-shaped. However, other various shapes may also be adopted.

Optical paths and scale of individual constituent elements or the like shown in the figures are schematically represented for explanation's sake and do not coincide with actual optical paths, scale or the like.

It is to be noted that, by properly combining the arbitrary embodiments of the aforementioned various embodiments, the effects possessed by them can be produced.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The entire disclosure of Japanese Patent Application No. 2011-149298 filed on Jul. 5, 2011 and Japanese Patent Application No. 2012-103586 filed on Apr. 27, 2012, including specifications, claims, drawings, and abstracts are incorporated herein by reference in its entirety.

The invention is applicable to backlights of liquid crystal televisions, laptop type personal computers, light-emitting devices of illuminating apparatuses, and the like.

What is claimed is:

1. A light guide plate comprising:
an incident surface on which light is incident;
an outgoing surface from which light incident on the incident surface is outputted;
a reflection-and-propagation surface at which the light incident on the incident surface is reflected so as to propagate toward the outgoing surface, the reflection-and-propagation surface opposing the outgoing surface;
a plurality of prism grooves formed in the reflection-and-propagation surface and extending parallel to the incident surface;
a flat surface portion formed in a region extending an entire length of the outgoing surface adjacent to the incident surface, the flat surface portion having no prism protrusions;
a propagation auxiliary region of the outgoing surface adjacent to the flat surface portion, a plurality of inclined prism protrusions extending orthogonal to the incident surface and a plurality of planar portions being formed alternately in a direction parallel to the incident surface, respectively, the prism protrusions being spaced apart from the incident surface by a constant distance;
a first prism portion of the outgoing surface adjacent to the propagation auxiliary region, a plurality of inclined prism protrusions extending orthogonal to the incident surface and a plurality of planar portions being formed alternately in a direction parallel to the incident surface, respectively; and
a second prism portion of the outgoing surface not adjacent to the propagation auxiliary region but adjacent to the first prism portion, a plurality of prism protrusions with a constant height extending orthogonal to the incident surface being formed in the second prism portion with no planar portions formed therein.

2. The light guide plate according to claim 1, wherein ridges of the prism protrusions of the propagation auxiliary region and ridges of the prism protrusions of the first prism portion are formed in continuation to each other, and
the ridges of the prism protrusions in the propagation auxiliary region are larger in gradient than the ridges of the prism protrusions in the first prism portion.

3. A backlight unit comprising:
the light guide plate according to claim 1; and
a plurality of point light sources.

4. A surface light source device comprising:
the light guide plate according to claim 1;
at least one diffusion sheet;
at least one prism sheet;
a plurality of optical sheets for controlling light derived from the light guide plate; and
a reflecting sheet provided on one side opposite to the diffusion sheet with the light guide plate interposed therebetween and reflecting light toward the outgoing surface.

5. The light guide plate according to claim 1, wherein the constant distance is equal to a width of the flat surface portion, and the flat surface portion is located between the incident surface and the propagation auxiliary region.

* * * * *